US007520667B2

(12) United States Patent
Påhlsson et al.

(10) Patent No.: US 7,520,667 B2
(45) Date of Patent: Apr. 21, 2009

(54) METHOD AND SYSTEM FOR DETERMINING PROCESS PARAMETERS

(75) Inventors: Sten Påhlsson, Ödåkra (SE); Ramesh M. Gunawardena, Solon, OH (US)

(73) Assignee: John Bean Technologies AB, Helsingborg (SE)

( * ) Notice: Subject to any disclaimer, the term of this patent is extended or adjusted under 35 U.S.C. 154(b) by 146 days.

(21) Appl. No.: 11/432,296

(22) Filed: May 11, 2006

(65) Prior Publication Data

US 2007/0265523 A1 Nov. 15, 2007

(51) Int. Cl.
*G01N 25/00* (2006.01)
*G01N 25/58* (2006.01)

(52) U.S. Cl. .......................... 374/45; 374/120; 374/117

(58) Field of Classification Search ................. 374/4–6, 374/120, 121, 45, 57, 135, 137, 30, 117–119, 374/100, 15
See application file for complete search history.

(56) References Cited

U.S. PATENT DOCUMENTS 2,956,281 A * 10/1960 McMillan et al. ........... 343/872
3,859,493 A * 1/1975 Peterson ..................... 219/759
3,961,199 A 6/1976 Bronicki
4,167,878 A 9/1979 Bottcher et al.
4,326,163 A 4/1982 Brooke
4,499,357 A 2/1985 Kojima
4,627,442 A * 12/1986 Land .......................... 600/549
4,632,127 A * 12/1986 Sterzer ....................... 607/156
4,679,561 A * 7/1987 Doss ........................... 607/99
4,798,209 A * 1/1989 Klingenbeck et al. ....... 600/430
4,805,627 A * 2/1989 Klingenbeck et al. ....... 600/425
4,876,059 A * 10/1989 Conroy ....................... 376/247
4,972,699 A 11/1990 Berger et al.
5,047,713 A * 9/1991 Kirino et al. ................ 324/752

(Continued)

FOREIGN PATENT DOCUMENTS

DE 4311103 A1 10/1994

(Continued)

OTHER PUBLICATIONS

Derwent Publications Ltd., London, GB; 1984-068151 & SU1019312 A (DAVY-1) DAVYDOV NV, May 23, 1984.

(Continued)

*Primary Examiner*—Gail Verbitsky
(74) *Attorney, Agent, or Firm*—Christensen O'Connor Johnson Kindness PLLC

(57) ABSTRACT

The present invention relates to a method and a system for determining a set of process parameters of a treatment unit in which unit a product is subjected to a temperature treatment, the method comprising: subjecting a product to an electromagnetic signal before, during and/or after a temperature treatment, wherein said electromagnetic signal is adapted to interact with said product dependent upon the dielectric constant distribution of said product, receiving an electromagnetic signal which has interacted with said product, analysing the received electromagnetic signal in comparison with the transmitted electromagnetic signal and thereby determining a response being dependent upon the dielectric constant distribution of said product and based thereupon determine the temperature (distribution) or water content of the product, and analysing said temperature distribution or temperature of the product or products and based thereupon determining a set of process parameters for a temperature treatment in a treatment unit.

14 Claims, 9 Drawing Sheets

U.S. PATENT DOCUMENTS

| | | | | | |
|---|---|---|---|---|---|
| 5,115,673 | A | | 5/1992 | Kline et al. | |
| 5,363,050 | A | | 11/1994 | Guo et al. | |
| 5,369,369 | A | * | 11/1994 | Cutmore | 324/637 |
| 5,502,393 | A | | 3/1996 | Yamaguchi et al. | |
| 5,588,032 | A | | 12/1996 | Johnson et al. | |
| 5,715,819 | A | * | 2/1998 | Svenson et al. | 600/425 |
| 5,800,350 | A | * | 9/1998 | Coppleson et al. | 600/372 |
| 5,886,534 | A | | 3/1999 | Bakhtiari et al. | |
| 5,899,857 | A | | 5/1999 | Wilk | |
| 6,002,958 | A | * | 12/1999 | Godik | 600/407 |
| 6,006,128 | A | | 12/1999 | Izatt et al. | |
| 6,026,173 | A | | 2/2000 | Svenson et al. | |
| 6,422,741 | B2 | * | 7/2002 | Murphy et al. | 374/5 |
| 6,536,948 | B1 | * | 3/2003 | Vivekanandan et al. | 374/161 |
| 6,690,016 | B1 | * | 2/2004 | Watkins et al. | 250/341.7 |
| 6,839,636 | B1 | * | 1/2005 | Sunshine et al. | 702/22 |
| 7,056,011 | B2 | * | 6/2006 | Pesach | 374/43 |
| 2003/0024315 | A1 | | 2/2003 | Merkel et al. | |
| 2007/0016032 | A1 | * | 1/2007 | Aknine | 600/437 |
| 2008/0166095 | A1 | * | 7/2008 | Popovic et al. | 385/126 |

FOREIGN PATENT DOCUMENTS

| | | | |
|---|---|---|---|
| DE | 29719600 | U1 | 2/1998 |
| EP | 0232802 | A1 | 8/1987 |
| EP | 0619485 | A1 | 10/1994 |
| EP | 0990887 | A2 | 4/2000 |
| GB | 2145245 | A | 3/1985 |
| GB | 2262807 | A | 6/1993 |
| SE | 449138 | B | 4/1987 |
| SE | 512315 | C2 | 7/1998 |
| WO | WO 96/21153 | A1 | 7/1996 |
| WO | WO 98/01069 | A2 | 1/1998 |
| WO | WO 99/15883 | A1 | 4/1999 |
| WO | WO 2004/029600 | A1 | 4/2004 |

OTHER PUBLICATIONS

Derwent Publications Ltd., London, GB; AN 1986-129887, SU 1185269A, Oct. 15, 1985.

Derwent Publications Ltd., London, GB; AN 1994-180890 & SU944468A1 (ASRA), Jan. 15, 1993.

Shi, Y., et al., "Ultrasonic Thermal Imaging of Microwave Absorption," Proceedings of the *IEEE International Ultrasonics Symposium 1:224-227*, Honolulu, Hawaii, Oct. 5-8, 2003.

* cited by examiner

METHOD AND SYSTEM FOR DETERMINING PROCESS PARAMETERS

FIELD OF INVENTION

The invention relates to a method of determining a set of process parameters of a treatment unit in which unit a product is subjected to a temperature treatment.

The invention further relates to a system for determining a set of process parameters of a temperature treatment unit.

TECHNICAL BACKGROUND

There exist a number of different kinds of methods for measuring the temperature of a product.

U.S. Pat. No. 4,499,357 discloses an electronically controlled cooking apparatus in which an article to be heated is heated for cooking through measurement of temperature thereof by an infrared sensor. The infrared sensor is arranged to detect surface temperature of the article to be heated in electronically controlled cooking apparatuses of this kind. A problem with heating of food products is that the surface often reaches a high temperature fairly quickly whereas it often takes considerable time before the inside of the product reaches the required temperature. U.S. Pat. No. 4,499,357 addresses this problem by introducing a predetermined minimum heating time period being set such that heating of the article to be heated is unconditionally continued during the predetermined minimum heating time period after starting of heating of the article to be heated. This method relies on some kind of comparative temperature measurement, on that the heating process actually behaves as expected and that the products all have size and shape within relatively narrow intervals compared to the product used for the comparative temperature measurements. If something deviates from the expected ranges this method may indicate satisfactory surface temperature while the inside of the product may still be far from the desired temperature. It may especially be noticed that the operator may not even be aware of the fact that the inside has not reached the desired temperature.

GB2,145,245, on the other hand discloses an induction heating cooking apparatus adapted to be able to determine the temperature of the inside of the product. The apparatus is provided with a probe being inserted into the foodstuff to be cooked and detecting the temperature of the product. It is however often not acceptable to use a probe being inserted into the inside of the product. It is also difficult to use this kind of probing in an industrial process where a large number of products are treated simultaneously on a conveyor or the like.

EP0232802A1 discloses an apparatus for monitoring the cooking state of a substance, comprising an infrared light emitter and a sensor adapted to receive infrared light sent through product. The apparatus relies on that an alimentary substance being cooked varies its infrared light transparency, and thus the infrared light transmission and reflection coefficients, as the cooking process proceeds. As recognised in EP0232802A1 itself this method has its limitations and proposes that the light emitter and sensor are properly inserted into the substance to be monitored in order to give detailed results. As mentioned above is this kind of apparatus not satisfactory.

US2003024315, assigned to the present applicant, discloses a device for measuring the distribution of selected properties of materials. The device comprises an emitter of electromagnetic radiation and furthermore at least one sensor of a first type. The emitter emits electromagnetic radiation in a selected frequency range towards said materials and a sensor of the first type detects electromagnetic radiation in a selected frequency range coming from said materials. The detected electromagnetic radiation having been emitted by said emitter. The device also comprises means to generate a three-dimensional image contour information regarding the said material's position in space, and an analyser which (a) receives information from said sensors, (b) processes this information, and (c) generates signals containing information about the distribution of said properties as output.

SUMMARY OF THE INVENTION

It is an object of the invention to provide a method of determining a set of process parameters of a treatment unit in which unit a product is subjected to a temperature treatment.

It is a further object of the invention to provide a system for determining a set of process parameters of a temperature treatment unit.

In accordance with the invention a method of determining a set of process parameters of a treatment unit in which treatment unit a product is subjected to a temperature treatment has been provided. The method comprises providing a product, subjecting said product to a temperature treatment in a treatment unit, subjecting said product to a transmitted electromagnetic signal before, during and/or after said temperature treatment, wherein said transmitted electromagnetic signal is adapted to interact with said product, the product having a dielectric constant distribution and wherein said transmitted electromagnetic signal interacts with said product dependent upon the dielectric constant distribution of said product, receiving an electromagnetic signal which has interacted with said product, analysing the received electromagnetic signal in comparison with the transmitted electromagnetic signal and thereby determining a response being dependent upon the dielectric constant distribution of said product and based on said response determine the temperature distribution of said product or the temperature in a predetermined location of said product or the water content within the product, and analysing said temperature distribution, temperature, or water content of said product or a plurality of said products and based thereupon determining a set of process parameters for a temperature treatment in a treatment unit.

By using the above method the determined appropriate process parameters may take into account the actual temperature distribution within the product. The temperature treatment, such as heating, cooking, frying, freezing, cooling or the like, may thereby be optimised to an extent not before disclosed. If an analysis of a product e.g. before the introduction into an oven reveals that the central portion of the product to be cooked in the oven is frozen while the outer portion is thawed it may e.g. be suitable to heat the product slowly in the beginning until all of the product is thawed before the actual cooking occurs at a higher temperature. A similar consideration may also be taken into account if the temperature measurement is performed after the treatment and it is found that the temperature distribution within the product is unsatisfactory in that the coldest portion is too close to a minimum temperature, while the surface is heated to a satisfactory level.

The method may also be used to determine the water content within the product. Applications where this is the case includes bakery and bakery products such as bread, cakes, cookies, crackers, crispbread and different kinds of dough and dough substances. Its uses also includes grain storage and mills where it is used to ensure that the water content is not too high (risk for mould and spores in grain and flour, and of course in bakeries to ensuring the quality of the flour used for the baking. Too high water content in grain may pose a fire hazard and moreover the price on grain is often dependent upon the water content. The method may also be used in production of different kinds of products with mixed in meat such as sausages and delicatessen. It is also useful for dairies where it is used for determining the water content in milk, butter and cheese. Also when drying and storing different food products it may used to ensure that the product is stored at a water content being below a certain percentage in order to avoid mould and spores, etc.

Moreover, the method is non-invasive and it may be used for different kinds of control set-ups, such as controlling a treatment unit directly or to determine calibration parameters.

Process parameters include flow rate of a heating or cooling medium (e.g. air), temperature of a heating or cooling medium, temperature of e.g. heaters in an oven or the like or cooling blocks in a freezer or the like, time of temperature treatment (set e.g. by holding time or by speed of conveyor carrying the products through the treatment unit), amount of mixed cooling medium (e.g. $CO_2$ in ground meat), mixing rate (e.g. by drying), the different settings of process parameters in different parts of the treatment unit, the different settings of several treatment units in parallel (adapted e.g. to treat products with different preconditions) and in series (adapted e.g. to treat a product in several steps), degree of impingement (in e.g. impingement freezers or impingement ovens).

A number of different ways to make use of the inventive method will be discussed in more detail in the detailed description.

It may also be noted that the different actions of the method may be performed by different units and even at different locations. Transmitting and receiving the electromagnetic signal is performed where the product to be analysed is located. In practice this will be inside or in the vicinity (before or after) of the treatment unit, such as when the product is transported on a conveyor to, inside, or from the treatment unit. The method will require handling of an considerable amount of data. Especially the analysis of the received electromagnetic signal in comparison with the transmitted electromagnetic signal and the determination of a response being dependent upon the dielectric constant distribution involves handling of an considerable amount of data. The actions of the method up until and including this analysis will thereby preferably be performed at site. The result will be that the temperature distribution or at least the dielectric constant distribution will be known. In the latter case, the final action of determining the temperature may be performed at site or at a different location.

The analysis of the temperature or temperature distribution may be performed on site or at a different centralised location. One advantage with using a centralised location is that temperature measurements from several treatment units at completely different locations may be used as input in the determination of appropriate process parameters. It is also easier to provide expert operators supervising or guiding the analysis and determination of appropriate process parameters. It is also easier to update the equipment (hardware and software) used to perform the analysis and determination of appropriate process parameters.

It may also be noted that a semi-centralised system may be used. Such a set-up may be provided with an on-site analysis and determination of the appropriate process parameters, while the dielectric constant or temperature distribution also is transmitted to a centralised analysis centre. In such a case the on-site analysis may be used for more immediate changes necessitated by local circumstances, such as controlling start-up, controlling treatment temperature and time, discarding of defectively treated products, whereas the centralised analysis centre may be used for determination of more complex process control parameters, such as the suitable temperature profile in the cooking equipment.

Preferred embodiments of the invention are apparent from the dependent claims.

The method may further comprise providing said determined process parameters to a treatment unit. This way an expedient and secure control of the treatment unit is achieved. The feedback to the treatment unit may be provided automatically in response to the temperature analysis or be provided by an operator in response to the performed analysis.

The method may further comprise receiving data representing the temperature distribution or temperature of a plurality of products and based on said received data determining said set of process parameters for a temperature treatment in a treatment unit. This way e.g. trends may be detected and the appropriate change of process parameters may in such a case be changed even before a predetermined limit is reached.

The method may further comprise receiving data representing the temperature distribution or temperature of a plurality of products treated in a plurality of treatment units and based on said received data determining said set of process parameters for a temperature treatment in a treatment unit. By analysing data from several treatment units it will e.g. be possible to detect if a specific treatment unit has a non-typical response to a change in process parameters thereby making it possible to investigate treatment units with too low yield. It will also be possible to determine a set of process parameters that will provide a robust treatment process that can be performed on different treatment units even if they run under slightly different circumstances. The set of process parameters determined from data from several treatment units may also be provided to other treatment units than those that has provided the data.

The method may further comprise subjecting said product to a second signal capable of providing a local change, in time and position, of the dielectric constant distribution of said product, thereby providing an interference between the second signal and the transmitted electromagnetic signal as the transmitted electromagnetic signal interacts with the product being subjected to said local, in time and position, change of the dielectric constant distribution.

The interference phenomenon makes it possible to determine the point where the two signals have interfered and from where the dielectric constant has given rise to change of the received the electromagnetic signal compared to the transmitted electromagnetic signal. The electromagnetic (e.g. microwave) signal exhibits damping and phase delay by travelling through the product leaving the frequency unchanged. In those volumes of the product under test where the interference occurs (e.g. where the ultrasound wave creates a density displacement) a part of the electromagnetic (e.g. microwave) signal is shifted in frequency and upper and lower sidebands are created. By receiving these frequency shifted signals and studying e.g. the damping and phase delay it is possible to get information concerning the dielectric constant between the point of interference and the point of receipt of the signal. By creating a interference patter in e.g. a layer-by-layer fashion it will be possible to simplify and to speed up the analysis considerably. This may e.g. be done by measuring the dielectric constant initially in an outermost surface layer by creating an interference close to the surface and then measure the signal as it passes through this layer. This will give information concerning the dielectric constant in this layer and this will then be a known parameter when analysing the response from an interference in a second outermost layer giving rise to a interfered signal travelling through the second (unknown) outermost layer and the outermost (known) layer. Other kinds of controlled interference sweeps or systems may also be used. The actual sweep of the interference may be optimised considering practical aspects as long as the information may draw benefit from the fact that the known origin of the interfered signal facilitates the analysis. It is also contemplated that the analysis may be performed in the fly, i.e. during the sweep of the interference but it is also contemplated that the analysis is performed at a later time after the complete data set has been collected. If the practically feasible sweep pattern correlates with a convenient analysis set-up it is possible to determine the temperature in the fly (and thereby to end the measurement when enough information has been received). With a double interference system it will e.g. also be possible to provide two virtual probes within a product. This is discussed in more detail in the detailed description.

The second signal may be a signal capable of providing, in time and position, a local change of the density of said product and thereby locally, in time and position, influencing the dielectric constant distribution. This is a preferred way of creating the above mentioned interference between the transmitted electromagnetic signal and the second signal.

The second signal may be an ultrasound signal. This is a preferred way of creating the above mentioned local change of the density of the product. The short wavelength of the ultrasound will noticeably also be determining the resolution of the measurement, since the frequency shift of the electromagnetic signal will be provided where the ultrasound signal provides the local change in density.

The electromagnetic signal may be a microwave signal. This signal is preferred since it experiences a measurable phase delay and damping but is not absorb too much by food products or the like.

In accordance with the invention a system for determining a set of process parameters of a temperature treatment unit has been provided.

The system comprising: a first transmitter adapted to subject a product to a transmitted electromagnetic signal before, during and/or after a temperature treatment of said product, wherein the transmitted electromagnetic signal is adapted to interact with said product, the product having a dielectric constant distribution and wherein said transmitted electromagnetic signal interacts with said product dependent upon the dielectric constant distribution of said product, a receiver adapted to receive an electromagnetic signal which has interacted with said product, a signal analyser adapted to analyse the electromagnetic signal received by the receiver in comparison with the electromagnetic signal transmitted by the transmitter and thereby determining a response being dependent upon the dielectric constant distribution of said product and based on said response determine the temperature distribution of said product or the temperature in a predetermined location of said product or the water content of said product before, during and/or after said temperature treatment, and a temperature analyser adapted to analyse said temperature distribution, temperature or water content of said product or a plurality of said products and based thereupon determine a set of process parameters for a temperature treatment in a treatment unit.

The advantages of the system has been discussed in detail with reference to the method and reference is made to that discussion. It may however especially be noted that the system may be separate from any treatment unit or may form an integral part of the control system of the treatment unit. It may also especially be noted that the different analysing units may be provided on site or on a centralised location as discussed in more detail above.

Preferred embodiments of the system will be apparent from the dependent claims. The advantages of respective feature of the dependent claims has also been discussed in detail with reference to the method and reference is made to that discussion.

The system may further comprise a control unit adapted to provide said determined process parameters to a treatment unit.

The temperature analyser may be adapted to receive data representing said temperature distribution or temperature of a plurality of products and to based upon said received data determine said set of process parameters for a temperature treatment in a treatment unit.

The temperature analyser may be adapted to receive data representing said temperature distribution or temperature of a plurality of products treated in a plurality of treatment units and based thereupon determine said set of process parameters for a temperature treatment in a treatment unit.

The system may further comprise a second transmitter adapted subject said product to a second signal capable of providing a local change, in time and position, of the dielectric constant distribution of said product, thereby being adapted to provide an interference between the second signal and the transmitted electromagnetic signal as a transmitted electromagnetic signal interacts with the product being subjected to said local, in time and position, change of the dielectric constant distribution.

The second transmitter may adapted subject said product to a second signal capable of providing a, in time and position, local change of the density of said product and thereby locally, in time and position, influencing the dielectric constant distribution.

The second transmitter may be an ultrasound transmitter.

The first transmitter may be a microwave transmitter.

It may also be noted that the features of each dependent claim may be combined with the features of the other independent claims except where the features of two or more independent claims relates to each other excluding alternatives.

BRIEF DESCRIPTION OF THE DRAWINGS

The invention will by way of example be described in more detail with reference to the appended schematic drawings, which shows presently preferred embodiments of the invention.

DETAILED DESCRIPTION OF PREFERRED EMBODIMENTS

Figure 1:
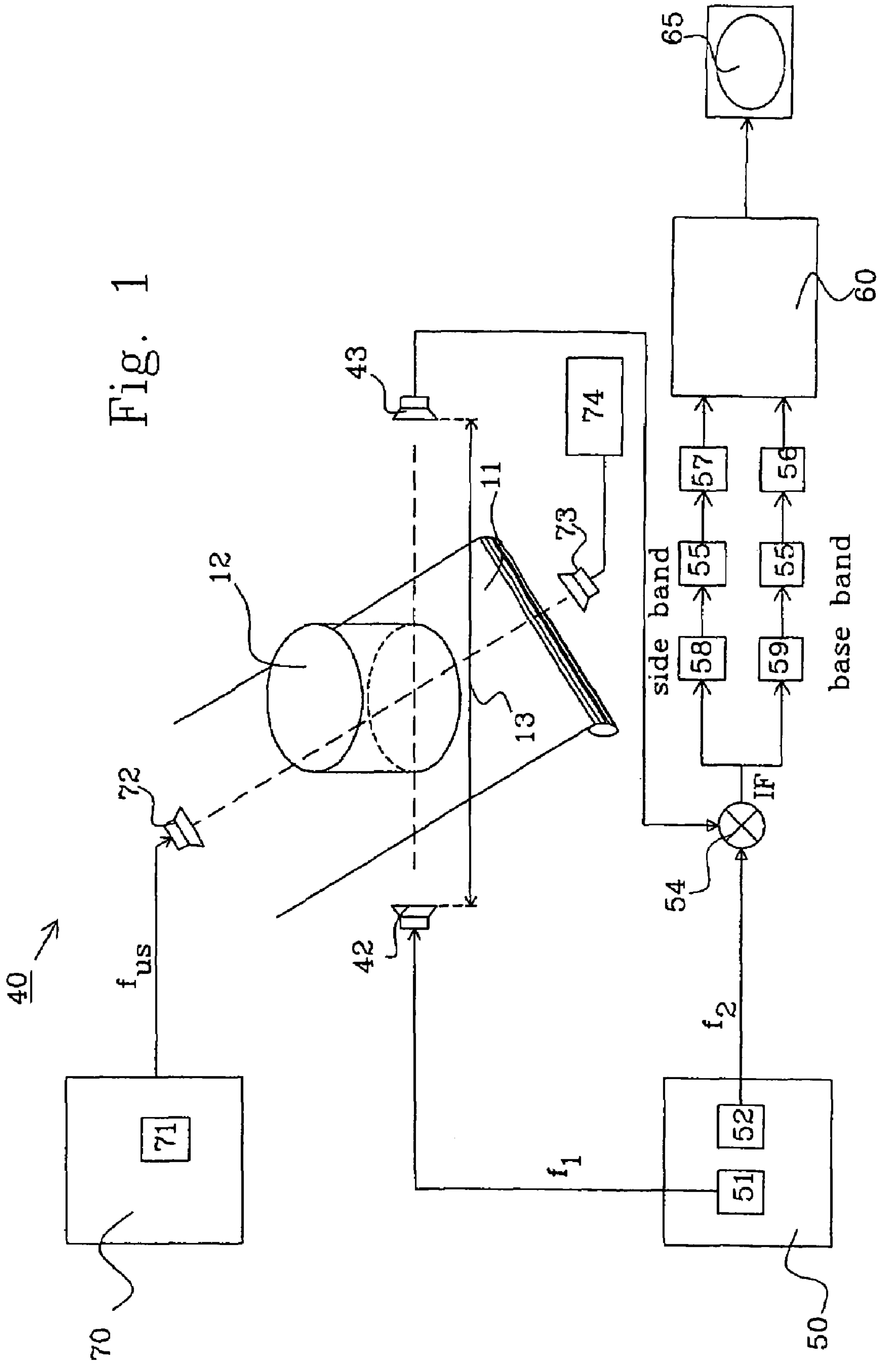
FIG. 1 shows a system according to the invention.

It may be noted that parts of the detailed description relating to the analysis of the response has already been described in an earlier not yet published application filed by the present applicant.

The system described is preferably to be used in the food industry. In the food industry, it is often important to accurately control the temperature of food products. When treating a product in a oven or the like, the process often aims at providing a specific minimum product temperature in order to secure required reduction of bacteria. When it cannot be ensured that the required temperature has been reached throughout the product one may have to discard the product. However, in order to get a high yield of the process and to secure good quality one must not treat the product by excessive temperatures. Therefore, there is a need for a non-destructed and non-contact control of the freezing of products. This problem may be solved by means of measuring the dielectric function and converting it to a distribution of temperature, as will be described in the following.

In a preferred embodiment the method of determining a set of process parameters of a treatment unit in which unit a product is subjected to a temperature treatment, the method comprises providing a product and subjecting the product to a temperature treatment in a treatment unit. The product is further subjected to a transmitted electromagnetic signal (microwave signal) in connection with the temperature treatment. The transmitted microwave signal interacts with the product in dependence upon the dielectric constant distribution of the product.

The product is further subjected to a second signal (ultrasound signal) capable of providing a local change, in time and position, of the dielectric constant distribution of said product. The ultrasound provides a local change of the dielectric constant by providing a local change in the density of the product as the ultrasound wave propagates through the product. This will result in an interference between the second (ultrasound) signal and the transmitted electromagnetic (microwave) signal as the transmitted electromagnetic signal interacts with the product being subjected to said local, in time and position, change of the dielectric constant distribution.

The electromagnetic signal which has interacted with the product (and thereby interfered with the ultrasound signal) is received and then analysed in comparison with the transmitted electromagnetic signal. Thereby a response being dependent upon the dielectric constant distribution of said product is determined and based on this response is the temperature distribution of the product determined.

Alternatively is the temperature in a predetermined location of the product determined. The temperature distribution or temperature of the product(s) is analysed and based thereupon is a set of process parameters for a temperature treatment in a treatment unit determined. The determined process parameters is then provided to a treatment unit.

In one embodiment the temperature measurement system is located at the exit of the temperature treatment unit, and thereby measures the temperature after the temperature treatment has been performed. This is especially suitable for ovens, fryers, steamers, cookers, etc where a specific temperature often has to be met to secure required log reduction of bacteria. The temperature measurements may be used to discard single products not meeting the required temperature. The measurements may also be used to control the treatment as discussed in more detail below. When the temperature measurement system is located at the exit of a freezer or cooler, it is contemplated that the temperature measurements are primarily used to optimise the process in respect of yield. If a certain freezing temperature has to be met to secure product quality during the marked the shelf life, the temperature measurement may also in this case be used for discarding single products.

Formers for forming e.g. dough and pasta, ground meat or the like, are often sensitive to product viscosity and temperature. The temperature measurement may in such a case e.g. be used to determine when a product in a cooler or thawing equipment is ready to be introduced into the forming equipment. It is also common to mix $CO_2$ with products to provide the correct viscosity before introducing it to a former. This is e.g. used for ground meat provided in a continuous flow to the forming equipment. In such an instance the temperature measurement may be used to determine the temperature of the flowing product and to thereby determine the amount of $CO_2$ to mix with the product.

The temperature measurement system described may be used to directly control the treatment unit in a feedback loop. However, in many cases this will introduce a process dynamics being difficult to control. The temperature measurement system of the invention is especially suitable for gathering data from a large number of products and in some cases also from a plurality of treatment units and then based on a statistical analysis determine a set of appropriate process parameters for a treatment unit (not necessarily being the one from which the data originates). Since the measuring method is non-destructive and does not require that any probe is in contact with or inserted into a product it may be used to determine the temperature or temperature distribution of in principal every single product treated in the treatment unit.

Another application where the measurement method may by used is in a two step process where the temperature is measured in-between the two treatment steps. When cooking in a two step process it is common that the first process is adapted to relatively rapid raise the temperature to a certain temperature and the second process is adapted to raise the temperature only slightly but to hold it for a longer time in order to ensure sufficient bacteria reduction. If the temperature of the first step is getting close to a lower acceptable temperature limit the holding time may be increased in order to still ensure sufficient bacteria reduction. Without the intermediate temperature measurement the problem would only be noticed after the complete process cycle, thereby often requiring cleaning of the complete process equipment before production is resumed.

When treating a product in a stack or some other process equipment with a considerable treatment time it may also be useful to measure the product temperature during the temperature treatment. The data may be analysed in order to provide an adjustment of the process parameters. Such a process may e.g. be a freezer, cooler, steamer or the like where the product is transported on a conveyor running in a helical path, thereby subjecting the product to a treatment during a considerable time period.

One application where temperature measurement before the treatment unit is especially suitable is when there are more than one parallel treatment unit or more than one parallel way through the treatment unit. It may e.g. be the case with an oven with more than one product conveyor running through the oven. In such a case the conveyors may run at different speeds and the products may be put on respective conveyor dependent upon the temperature before entering the oven.

Relatively cold products are placed on the slowly running conveyor and relatively warm products are placed on the faster conveyor.

It may also be noted that it is of course possible to combine different temperature measurement systems such that the temperature is measured before and after a treatment, or before and during a treatment, or during and after a treatment, or even before, during and after a treatment in a treatment unit.

It may also be said that the method may be used to evaluate a treatment unit performance and for continuous control of a treatment unit. When used for evaluating a treatment unit it may be used to set parameters based on a statistical analysis based on a large number of data. It may also be used to set parameters based on knowledge of a response with greater prediction quality than today. When using it for continuous control it may e.g. be used for slow control based on a statistical analysis, e.g. taking into account trends even when the process still runs well within the acceptable limits. It may also be used to set parameters as a automatic control based on knowledge of a response. It may also be used to update a model for selection of which properties a product may have and still be allowed.

The system may however be used for other kinds of applications, such as for drying tobacco, roasting coffee beans, or other temperature treatments of products with properties similar to food products.

A non-exclusive list of equipments where the temperature measurement method may be used comprises ovens, steamers, pasteurizers, fryers, freezers (spiral, fluidized beds, impingement, for liquids, pre-freezers, chillers, product stabilizers), blanchers, formers, mixers, grinders, char makers, batter and bread equipments, sorters, batch and continuous retorts (for cans, pouches and jars), fillers for cans, tube fillers e.g. for in-container-sterilisation.

There are a number of products which today are especially difficult to process in a way that ensures correct temperature treatment. Such products will benefit especially by the introduction of this temperature measurement method and system. Such products are e.g. formed and fully cooked chicken, meat balls or beef patties (both batter/breaded and not), whole muscle chicken parts/breasts (both batter/breaded and not).

Below the temperature measurement method as such will be discussed in more detail.

In a preferred embodiment, ultrasound and microwave methods are combined. Object reconstruction can be done by pure microwave inverse scattering methods and by pure ultrasound tomography methods with their respective limitations. In this embodiment ultrasound is not used as an object reconstruction tool but as a tool to generate a density variation in the object to be investigated. This density variation creates a change of phase and frequency in the transmitted microwave radiation that is used for object reconstruction. Therefore the available resolution of this method is determined by the resolution of the ultrasonic wave (smaller than a millimeter for typical medical ultrasound frequencies). The density readout is performed using microwave radiation (at a frequency where attenuation still allows reasonable penetration depths e.g. S, ISM5.8 or X band). This method avoids the fundamental difficulty of microwave tomography approaches that a millimeter resolution requires millimeter wavelengths. Unfortunately, most objects of interest absorbs millimeter radiation within a material thickness of some wavelengths and does therefore not allow any interior parameters to be extracted.

In the following a continuous wave (CW) microwave and pulse wave train ultrasound based system is described for sake of simplicity. The method described is not limited to this case. Other modulation schemes for both, electromagnetic waves and ultrasound waves such as amplitude modulation (AM), frequency modulation (FM) frequency modulated continuous wave (FMCW), pulse code modulation (PCM), phase modulation (PM) and wavelet based modulation techniques (WM) are applicable and are optimal for certain other applications.

FIG. 1 describes an apparatus or system 40 for temperature measurement. The temperature measurement system is placed close to a conveyor means 11, which transports the products under test 12 through the sensor measurement gap 13. The system 40 consists of a microwave system 50, an ultrasound system 70 and an evaluation unit 60. The system comprises in this embodiment two fixed-frequency microwave generators 51 and 52 and a fixed frequency ultrasound generator 71. The first microwave generator 51 has a first fixed microwave frequency $f_1$ (e.g. 5.818 GHz) and is coupled to at least one transmit antenna 42, and the second microwave generator 52 has a second fixed microwave frequency $f_2$ (e.g. 5.8 GHz) and is preferably coupled to a down converter 54, such as a mixer. The down converter shifts the transmitted microwave signal, which is collected by at least one receive antenna 43, and the received microwave signal from the second microwave generator 52 to a low intermediate frequency IF. This allows the microwave signal transmitted through the product under test 12 to be evaluated in amplitude and phase. It furthermore comprises a filter unit 59, an analog to digital converter ADC 55, a set of signal processors 56 and an evaluation processor 60 that contains necessary algorithms to control the system and to evaluate the data. The result is submitted to a display unit 65. The system 40 also comprises a set of transducers 72 (only one shown for sake of clarity), in addition to the transmit antenna 42 and receive antenna 43, all grouped around the measurement gap 13. The transducers emit an ultrasound signal having an ultrasound frequency $f_{US}$ (e.g. 4.5 MHz) through the product under test 12. This causes a density displacement travelling at ultrasound speed. At the same time a microwave signal from the first microwave generator 51 is emitted from the transmit antenna 42. This signal also travels through the product under test 12. The microwave signal exhibits damping and phase delay by travelling through the product leaving the microwave frequency unchanged. In those volumes of the product under test 12 where the ultrasound wave creates a density displacement, a part of the microwave signal is shifted in frequency and upper and lower sidebands are created. The transmitted microwave signal is collected using the microwave receive antenna 43. The received signal is down converted using the down converter unit 54. The low frequency signal is then filtered using a filter unit 59 and analog-digital converted using the ADC 55. The digital signal is evaluated using a receive signal processor 56. The receive signal processor 56 converts the incoming digital signal to zero frequency using standard state-of-the-art digital filters.

The outcome of this filtering corresponds to the $S_{21}$ parameter, which is not shifted in frequency, between the transmit 42 and receive 43 antenna as well known to a person familiar with the art. In the above we refer to the receive antenna 43 as microwave port 2 and the transmit antenna 42 as the microwave port 1.

In the system described by this invention there is a second set of bandpass filter 58, another ADC 55 and a second digital signal processor 57 in parallel to the first signal path 59, 55, 56.

The bandpass filter 59 is tuned to the difference frequency between the both microwave generators 51 and 52, which in the present embodiment is 5.818 GHz–5.8 GHz=18 MHz. The second bandpass filter 57 is tuned to the difference frequency between the microwave generators (e.g. 18 MHz) added the centre frequency (e.g. 4.5 MHz) of the ultrasound signal generator 71. Therefore this second digital signal processor path, containing 58, 55 and 57, converts the incoming signal to zero frequency that has been shifted in frequency by the ultrasound frequency. The measurement result is therefore limited to the cross section between the ultrasound and the microwave signal.

The IF bandwidth of the first 59, 55, 56 and second 58, 55, 57 digital receivers are chosen to be half the ultrasound frequency $f_{US}$ generated by the ultrasound generator 71. This is required to optimize the frequency shift by varying the ultrasound transducer phases. During the first stage of obtaining an ultrasound metric of the product 12, an ultrasound receiver 73 is present which collects the ultrasound radiation emitted from the transducers 72 and evaluate the damping, $T_{56}$, and runtime as described in more detail below. In the above we refer to the ultrasound receiver 73 as microwave port 6 and the transducers 72 as the microwave port 5. The damping and runtime is evaluated in an ultrasound evaluation unit 74, but this may naturally be integrated in the evaluation unit 60.

Figure 2:
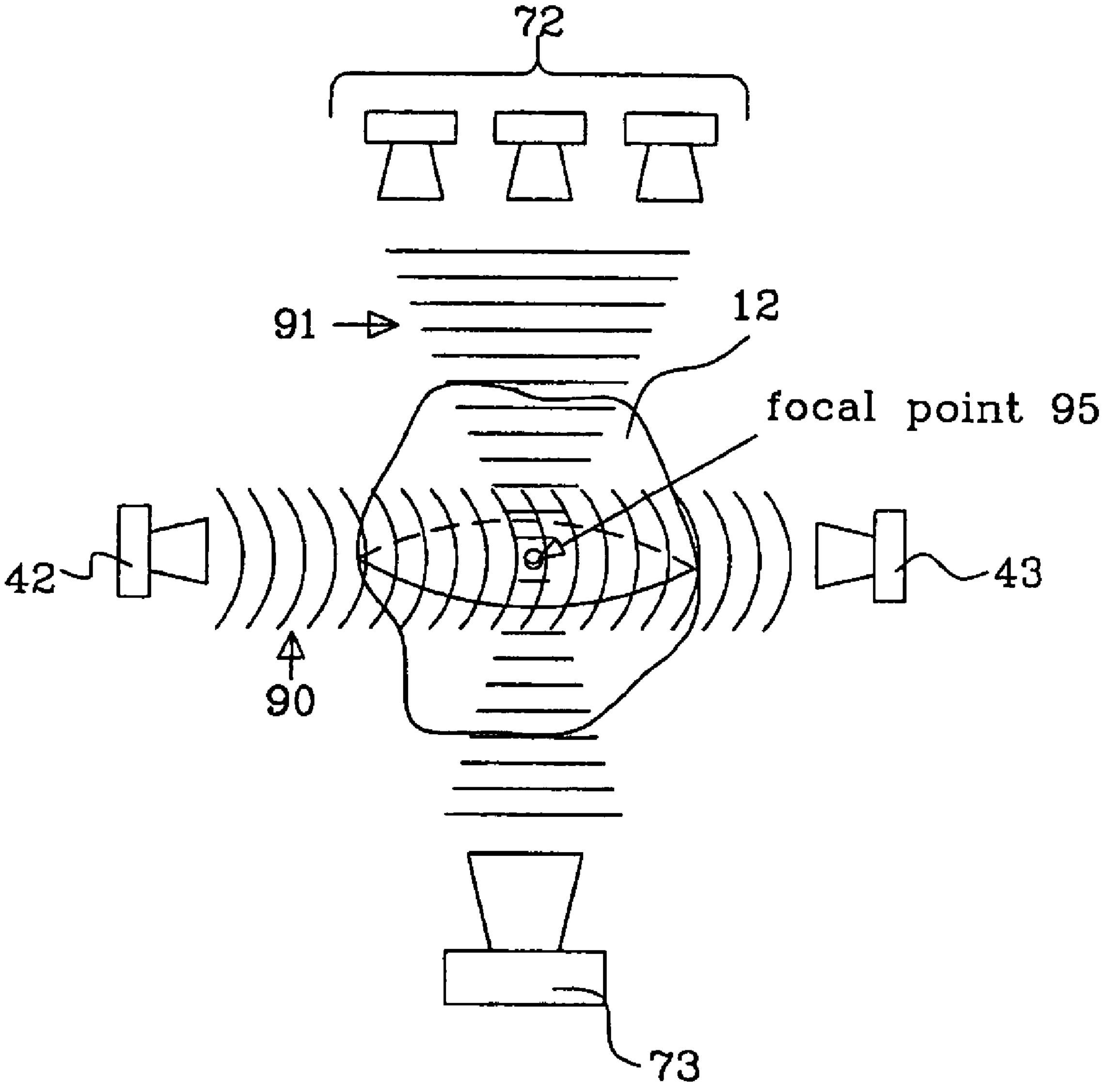
FIG. 2 illustrates the transmitted signal into a product under test.

FIG. 2 illustrates the emitted radiation into a product under test. The transducers 72 emit, in this example, an ultrasound pulse 91 through the product under test 12. This causes a density displacement travelling at ultrasound speed. At the same time a microwave signal 90 is emitted from the transmit antennas 42, travels through the product 12 and exhibit damping and phase delay with unchanged microwave frequency except in the area 95, where the ultrasound wave cause density displacement. In this area a part of the microwave signal is shifted in frequency, as described above, and upper and lower sidebands are created. The transmitted microwave signal 90 is collected using the receive antenna 43. The ultrasound wave 91 is collected in a receiver 73 during the process of obtaining the ultrasound metric, which is used during the next stage of determining the spatial distribution of the dielectric function.

Figure 3:
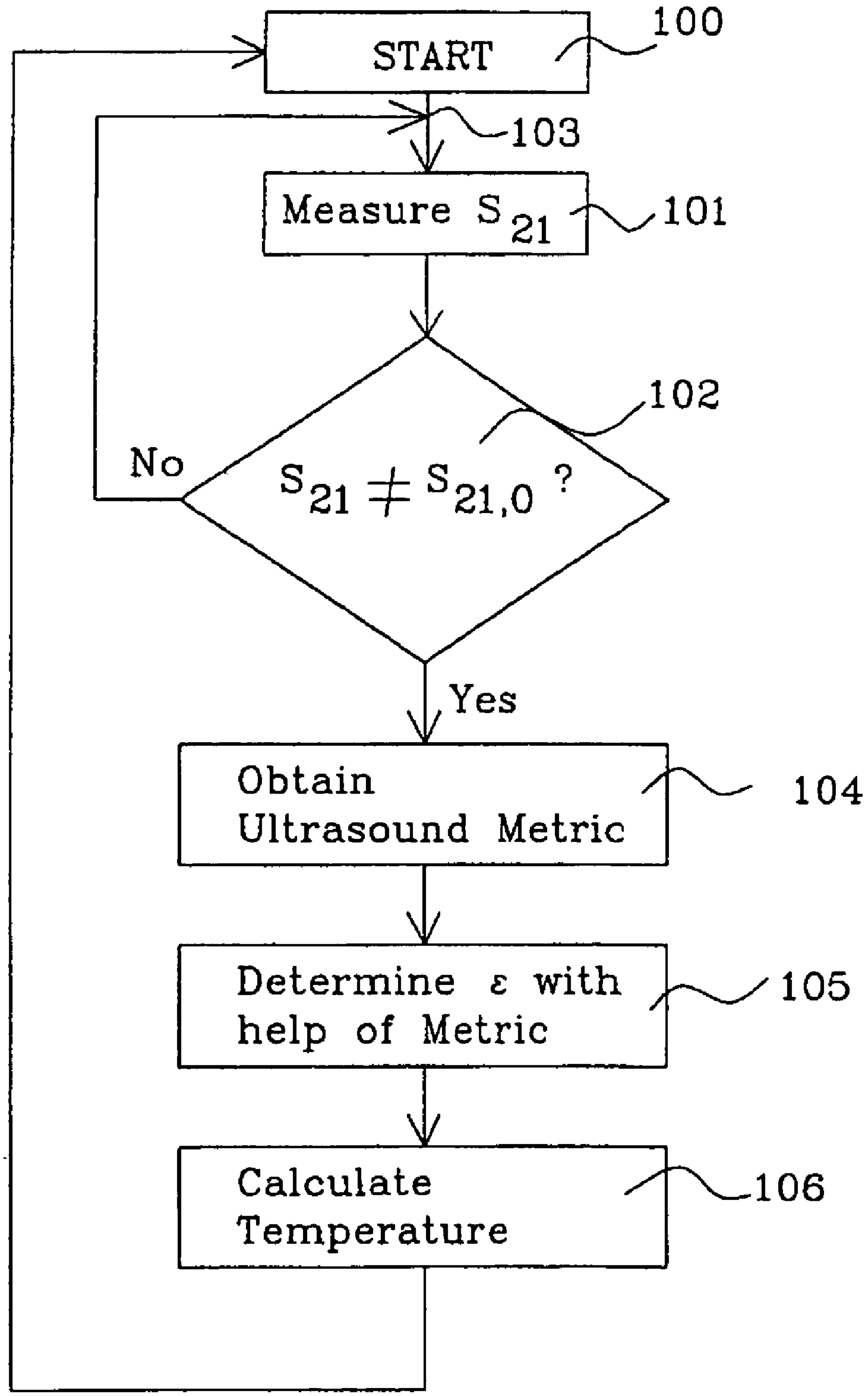
FIG. 3 shows a flow chart for determining a physical property, such as temperature, inside a product under test.

FIG. 3 show a flow chart describing the measurement principle according to the invention using a system as described in connection with FIG. 1.

Basically, the method of this invention is a microwave-ultrasound combination measurement method of the dielectric and the acousto-electric properties of matter where the resolution is inherited from the ultrasound wavelength.

The measurement procedure consists of three phases as described below.

Phase 1: Obtaining the Ultrasound Metric

In this phase a map of the local ultrasound runtime and damping properties are established which is henceforth referred to as the ultrasound metric.

By varying the phases between the ultrasound transducers 72 using a phase programming logic, any desired phase form of the ultrasound field can be generated. It is possible to control the phases of all ultrasound transducers in a way to focus the ultrasound power to a point with a geometrical size of the order of a half wavelength of the ultrasound wave. Focusing the ultrasound wave in the medium on the smallest possible volume causes the frequency displacement of the transmitted microwave signal to reach a maximum. Therefore, the phase of the ultrasound transducers is varied to optimize the microwave signal. Evaluating the delay time between the ultrasound pulse and the achieved maximum frequency shift allows determining at what distance from the antenna the focus point is located inside the product under test 2. This measurement is repeated for a set of points covering the whole product under test with a predetermined resolution.

As a result, a table comprising the phases to be chosen for each independent focus point and the location with respect to the antenna is obtained. At the same time, the strength of the maximum signal is obtained from each of these measurement points from all over the measurement object which allows to map the local ultrasound damping.

The local strength of the ultrasound signal is calculated by measuring runtimes and damping values between all ultrasound transducers. (Of course, any choice of phase is optimized by maximising the microwave signal for each point in this layer). Assuming these delay time and damping values for the layer of the product close to the transducers, the phase for the closest focus points are obtained.

Tuning the phases for transmission to focus the ultrasound power in one focus point and tuning the phases for reception to focus on another focus point, the runtime between the two focus points of the first layer is obtained.

Assuming these values to be valid around the focus points and also close to the next layer of points, phase and amplitude values for one after the other point of the next layer are obtained. (Of course, any choice of phase is optimized by maximizing the microwave signal for each point in any layer.)

This process is repeated until the whole product under test is scanned.

The result is a table of the local damping of the ultrasound signal and the local phase delay of the ultrasound signal between all scanned focal points, the "ultrasound metric" together with the microwave signal strength for all the focal points.

The ultrasound metric may be obtained on a reference object, which is representative to the objects that are to be analysed. Thereafter, measurements may be made on such objects without the need of obtaining an ultrasound metric for each of the objects.

The metric by itself can also be considered as a substantial result of the invention and can be used as autonomous applications. Furthermore, metrics obtained on reference objects may be used as means to speed up measurements according to phase 1.

Phase 2: Evaluating the Microwave Interaction

Based on the above generated ultrasound metric and the microwave response the acousto-electric interaction is obtained in a layer-by-layer wise starting from the layer closest to the microwave antennas. It is not required to proceed this analysis in a layer by layer way but it proves convenient for a subsequent 3D image processing to do so.

The strength of the microwave signal measured in each focal point is determined by the product of the (a) local strength of the ultrasound signal, (b) the compressibility, and (c) the dielectric function of the material in the focus point.

Since the local strength of the ultrasound signal in all focal points is known from the metric, the interaction between the incident and the frequency-shifted transmitted microwave signal on the layer closest to the microwave antenna is obtained by applying a Green's function theorem resulting in the dielectric function at this focal point. No other point interaction than the interaction of this specific focal point is possible because the microwave sideband response must originate in the region where the ultrasound focus has extended during the measurement. Therefore the resolution of the method is given by the wave packet resolution of the ultrasound signal (down to 250 micrometers) and not by the microwave wavelength (of the order of several centimeters) in a non-disturbing way. Nevertheless the incident microwave signal is influenced by the neighbouring elements on the way from the transmit antenna to the focal point and also on the way to the receive antenna. The microwave signal at the focal point depends on all the dielectric points in the product under test and is represented by a linear form in the contrasts and the incident field amplitudes. The field collected in the receive antenna is also described by a linear form containing all unknown contrasts. For each measurement, a bilinear form containing all unknown contrasts is obtained. For each measurement, a new equation is generated. Since there is an equation for each focal point, the equation system can be solved in a one-to-one way without iteration.

The result is a map of the acousto-electric and the dielectric properties of the product under test with the same underlying special structure as the ultrasound metric.

Phase 3: Calculating the Acousto-dielectric Properties

The ultrasound damping is not significantly temperature dependent. In contrast the ultrasound runtime and the dielectric function together with the compressibility of the product exhibit a strong temperature dependence.

The ratio between compressibility and dielectric function yields a function of temperature. Using the dielectric and acousto-electric maps, the temperature of the measurement object is obtained.

Further details of the third phase are described in connection with FIG. 6 and FIGS. 7*a*-7*d*.

Having described the three phases in detail, the measurement will now be further described with reference to FIG. 3.

The flow starts at step 100, which means that a microwave signal at the first frequency $\omega_{transmit}=2\Pi f_1$ is sent out from the transmit antenna 42 and a microwave signal at a mix of frequencies $\omega_{transmit}$ and $\omega_{receive}$ is received at the receive antenna 43. A damping $S_{21}$ and a frequency offset $\delta$ and a signal generation at the offset frequency $S'_{21}$ between the two signals is measured in step 101, and in the following step 102 the measured damping $S_{21}$ is compared to a previously recorded reference damping $S_{21,0}$, which corresponds to the measured damping with an empty measurement gap 13, i.e. no object under test 12 is present in the gap. If the measured damping is equal to the damping with no object under test present in the gap, the flow is fed back to point 103 and the damping is measured again in step 101.

When an object is introduced in the measurement gap 13 the flow continues to step 104 where an ultrasound metric is obtained. This step is described more closely in connection with FIG. 4.

The spatial dielectric properties of the object is thereafter measured and calculated using the metric obtained in step 104. This procedure is described in more detail in connection with FIG. 5.

When the dielectric properties of the object is determined other physical properties may be determined, step 106, such as temperature, water content, density, etc., using the spatial distribution of the dielectric properties (based on predetermined $\in(T)$ models). Such models are known in the prior art, such as described in the published PCT-application WO02/18920.

Figure 4:
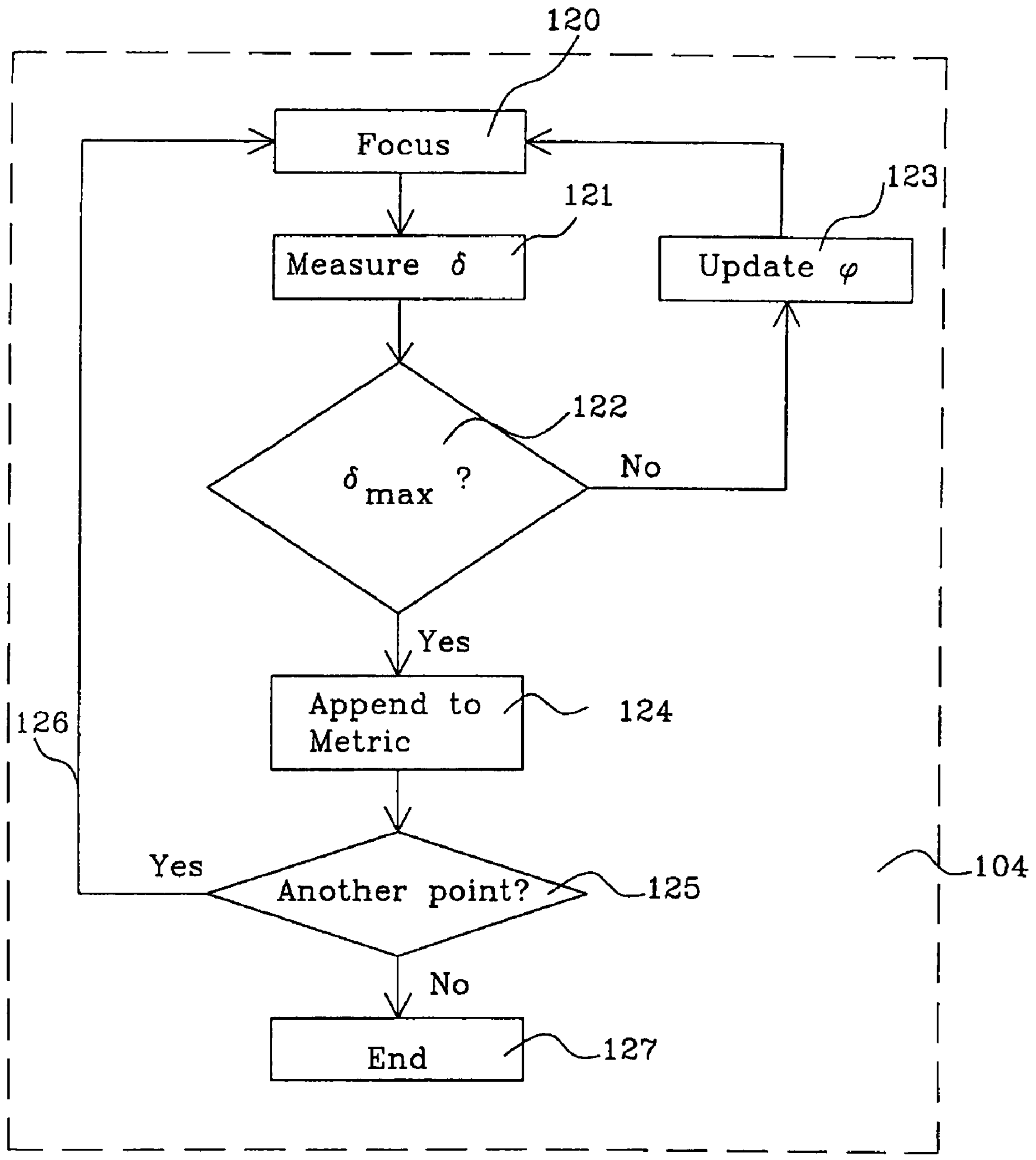
FIG. 4 shows a flow chart illustrating the process for obtaining an ultrasound metric.

FIG. 4 shows a flow chart disclosing the process of obtaining the ultrasound metric. The flow starts at step 120, where the ultrasound radiation is focused to a point in the object. The ultrasound will generate a signal in the sideband path, which corresponds to the frequency displacement measured by the microwave signal, denoted $\delta$ and an acoust-electric efficiency signal, which is measured in step 121 and in step 122 a check is made to determine if the acousto-electric efficiency signal is at maximum, if not the flow is fed back through step 123, where the value of the phase of the ultrasound signal is updated, to step 120. The process is repeated until the maximum frequency displacement is obtained. When the flow continues to step 124, the phase of the ultrasound signal together with information regarding the position of the focal point as described above, is stored in a memory. In step 125 it is determined if there are another point that should be measured to obtain the ultrasound metric of the product under test 12. If not, the process for obtaining the metric ends in step 127, or the flow is fed back via line 126 to step 120.

Measurement of the Dielectric Function Based on a Known Ultrasound Metric

Figure 5A:
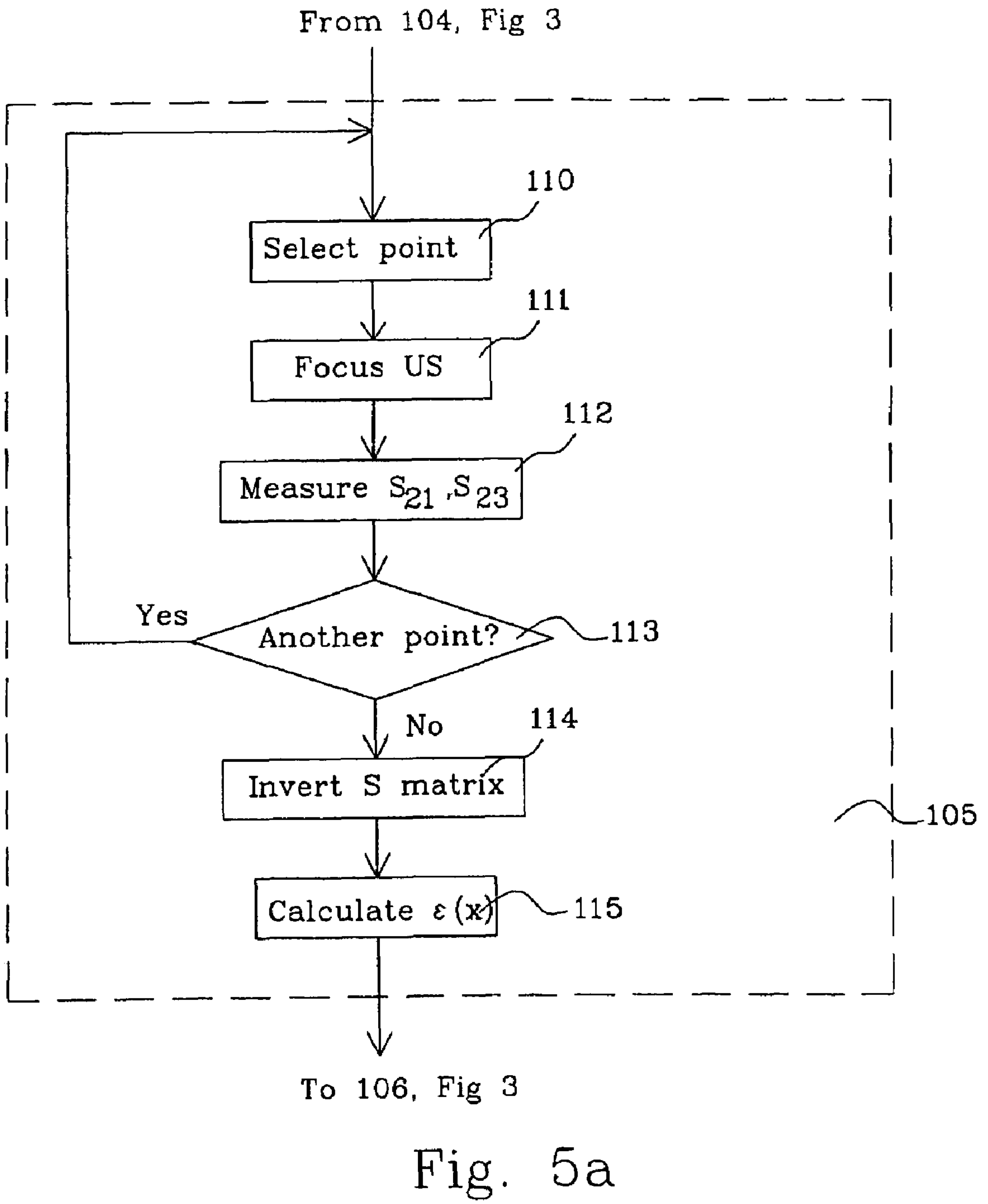
FIGS. 5*a* and 5*b* show flow charts illustrating two embodiments of the process for determining the spatial distribution of the dielectric function within a product under test.

FIG. 5*a* shows a first embodiment for determining the dielectric function in an object, such as a food product, to determine a physical property in the object, such as internal temperature without physically probing the object, during preparation of the object.

The flow starts in step 110, where a point in the object is selected. It is advantageous to select a point that has been used during the process of obtaining the ultrasound metric. The selected point corresponds to point 3 in equations 1-17.

The ultrasound radiation is thereafter focused on this point in step 111 and in step 112, the S-parameters $S_{31}$ and $S_{23}$ are measured, as described in more detail in connection with FIG. 6.

In step 113, a decision is made whether another point should be selected or not. If another point should be selected the flow is fed back to step 110, where a new point is selected before steps 111 and 112 are repeated. If not, the flow continues to step 114 where the matrix with the measured S-parameters is inverted to solve either $S_{31}$ for virtual receivers or $S_{32}$ for virtual transmitters.

The dielectric function $\in(x)$ for each selected point x is thereafter calculated in step 115 using prior art algorithm. The temperature in the selected point is thereafter calculated as indicated by step 106 in FIG. 3.

Figure 5B:
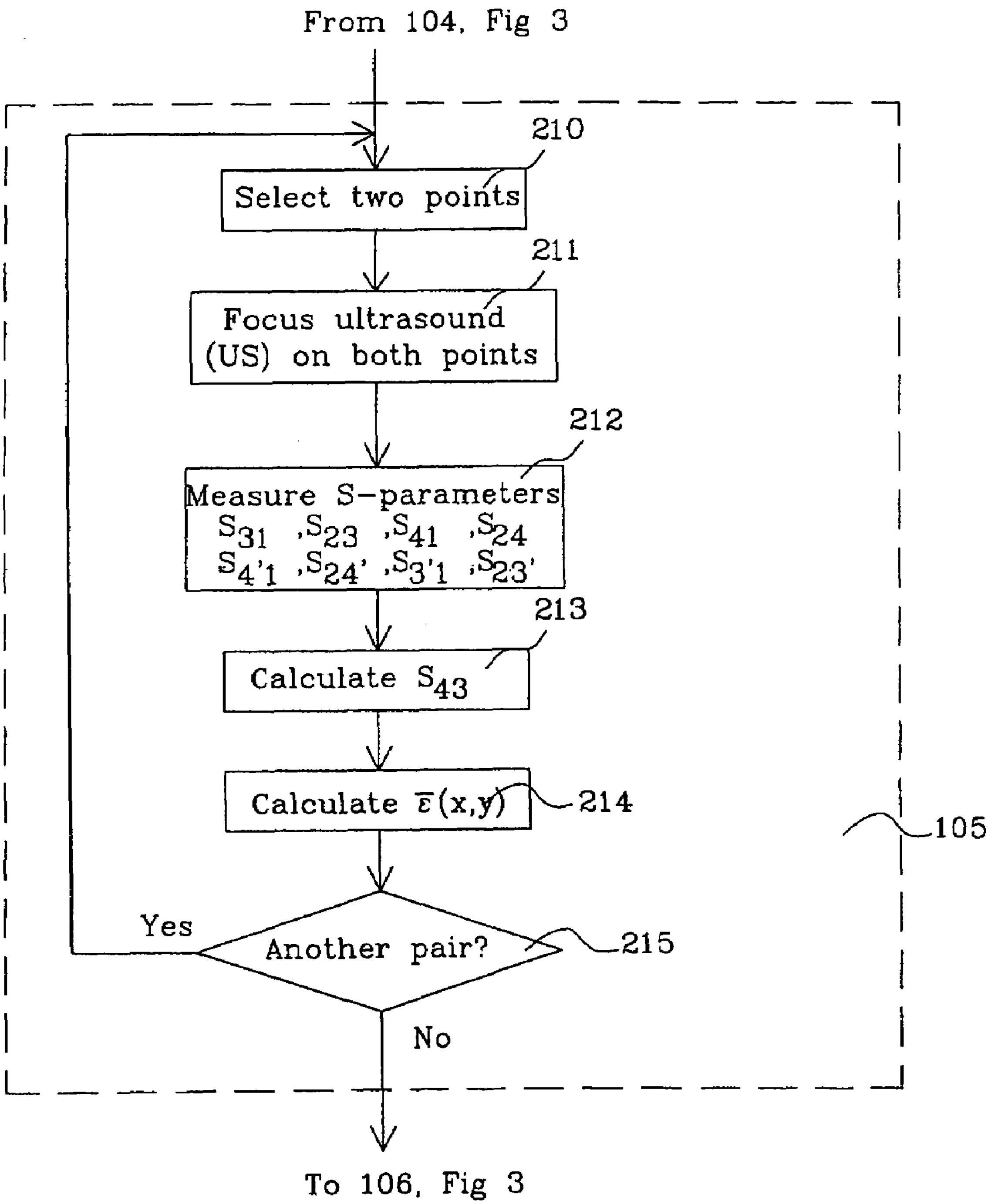

FIG. 5*b* shows a second embodiment for determining the dielectric function in an object, such as a food product, to determine a physical property between two locations in the object, such as material properties, e.g. the presence of a brain tumour, without physically probing the object.

The flow starts in step 210, where a pair of points in the object is selected. It is advantageous to select points that have been used during the process of obtaining the ultrasound metric. The selected points correspond to point 3 and 4 in equations 1-17.

The ultrasound radiation is thereafter focused on both points in step 211 and in step 212, the S-parameters $S_{31}$, $S_{23}$, $S_{41}$, $S_{24}$, $S_{4'1}$, $S_{24'}$, $S_{3'1}$and $S_{23'}$ are measured, as described in more detail in connection with FIG. 7.

The S-parameter $S_{43}$, i.e. the damping between the selected points, is calculated in step 213. Point 3 acts as a virtual transmitter and point 4 functions as a virtual receiver in this embodiment.

The mean value of the dielectric function $\overline{\in}(x,y)$ between the selected points x and y (i.e. points 3 and 4 in equations 1-7, is thereafter calculated in step 214.

In step 215, a decision is made whether another pair of points should be selected or not. If another pair of point should be selected the flow is fed back to step 210, where a new pair is selected before steps 211 to 214 are repeated. If not, the flow continues to step 106 in FIG. 3, where the desired physical properties are calculated.

First Use of the Invention

Figure 6:
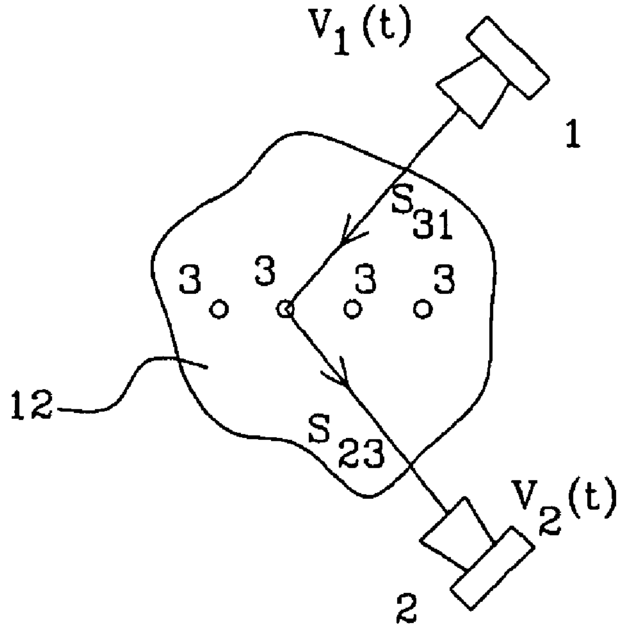
FIG. 6 shows a principal function of a first embodiment of the present invention.

FIG. 6 shows a schematically the function of a first use of the present invention. If an ultrasound metric u(x,t) is obtained for all points x within a product it is possible to calculate the dielectric constant in every point by applying the following steps:

1) Focus the ultrasound on one of the points 3. It is known that the ultrasound only affects the focal point concerning frequency shift of the microwave signal sent from the transmit antenna 1 to the receive antenna 2, thus generating a signal in the sidebands, i.e. microwave base frequency ($f_1$)±ultrasound frequency ($f_{US}$).

2) Measure the signal strength in at least one of the side bands. If the signal strength in both side bands is measured, a more reliable result from the measurement is obtained. The signal strength measured in the receive antenna 2 may be expressed as:

$$V_2(t)=S_{21}\cdot V_1(t)=S_{23}\cdot\alpha_3\cdot u_3(x,t)\cdot S_{31}\cdot V_1(t),$$

Where $S_{21}$ is the damping caused by the product 12 present in the measurement gap, $V_2(t)$ is the measured signal strength in the side band and $V_1(t)$ is the signal strength of the signal sent from the transmit antenna 1. $S_{23}$ is the damping between point 3 to the receive antenna 2, $\alpha_3$ is a factor that determines the efficiency in point 3 at which an ultrasound wave is converted into a microwave sideband signal (referred to as acousto-electric gain), $u_3(x,t)$ is the ultrasound metric in point 3 and $S_{31}$ is the damping between the transmit antenna 1 and point 3.

In a first approximation the efficiency α can be expressed as:

$$\alpha = \frac{\Delta\varepsilon}{y}$$

where Δ∈ is the change of dielectric constant due to the pressure wave cause by the ultrasound radiation, y. With the compression module κ, the relation $$\frac{\Delta\varepsilon}{\varepsilon - 1} = \kappa y$$

is established. The value of κ is known to a skilled person in the arts and will not be discussed in more detail.

3) Repeat the process for all desired points, denoted 3 in FIG. 6, in the product 12.

4) Use all measurement data in an inverse scattering algorithm and calculate the spatial distribution of the dielectric function in the product.

If an object moves at a relative slow speed, and fulfilling the relationship below, in relation to the measurement apparatus, no compensation of the emitted ultrasound and microwave radiation needs to be taken into consideration.

$$v_{obj}\cdot t_{meas} < \frac{v_{US}}{f_{US}} = d_{Focal},$$

$v_{obj}$ is the speed of the objects movement in the measurement gap 13, $t_{meas}$ is the measurement time for the complete process, $v_{US}$ is the speed of ultrasound in the object, $f_{US}$ is the ultrasound frequency and $d_{Focal}$ is the diameter of the focal point.

If the relative speed is high, the focusing of the ultrasound must include an adjustment of the ultrasound radiation, to maintain the focal point in the object during the measurement steps, to compensate for the movement. In addition $$\frac{v_{obj}}{v_{US}} \ll 1$$

to avoid Doppler shift.

Second Use of the Invention

FIGS. 7*a*-7*d* show a principal function of a second use of the present invention when calculating the dielectric constant between two points 3 and 4 in a product. A first point 3 may be considered to be a source and the second point 4 may be considered to be a receiver.

The principal function is very much the same as described in connection with FIG. 6, but with the exception that two upper and two lower sidebands are generated since two focal points 3 and 4 simultaneously generated by the ultrasound radiation. The first upper and lower side bands are the same as described in connection with FIG. 6, and the second upper and lower side band have the double ultrasound frequency, i.e. microwave base frequency ($f_1$)±2*ultrasound frequency ($2f_{US}$). If the same ultrasound frequency is used for this purpose, it is possible to choose two different ultrasound frequencies to generate second order sideband. The apparatus described in connection with FIG. 1 needs in this example to be added with an extra sideband path adjusted for the second upper and lower sideband.

The following relationships can be established for point 3 and 4, each as a single virtual source:

$$V_2(t)=S_{23}\cdot\alpha_3\cdot u_3(x,t)\cdot S_{31}\cdot V_1(t)\text{(solid line)} \quad 1$$

$$V_2(t)=S_{24}\cdot\alpha_4\cdot u_4(x,t)\cdot S_{41}\cdot V_1(t)\text{(dashed line)} \quad 2$$

Figure 7A:
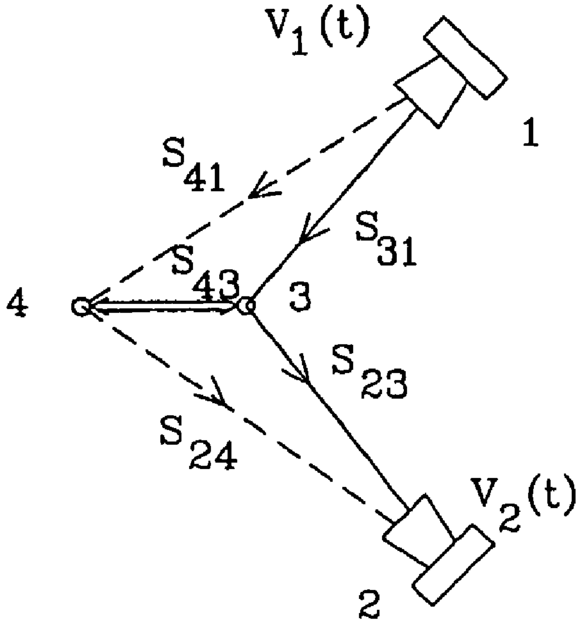
FIGS. 7*a*-7*d* show a principal function of a second embodiment of the present invention.
Figure 7B:
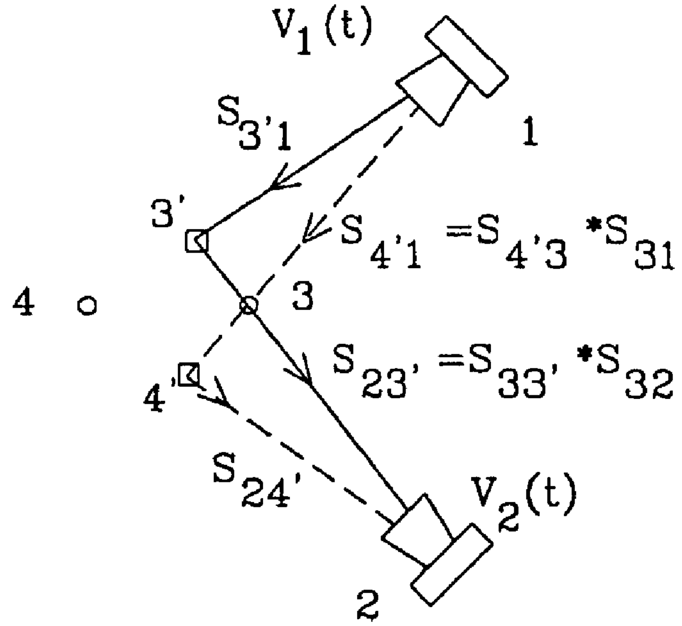

By displacing the focal point from 3 to 3' and the focal point from 4 to 4' according to FIG. 7*b* new relationships can be expressed:

$$V_2(t)=S_{23'}\cdot\alpha_{3'}\cdot u_{3'}(x,t)\cdot S_{3'1}\cdot V_1(t)\text{(solid line)} \quad 3$$

$$V_2(t)=S_{24'}\cdot\alpha_{4'}\cdot u_{4'}(x,t)\cdot S_{4'1}\cdot V_1(t)\text{(dashed line)} \quad 4$$

From FIG. 7*a* a relationship including the sought damping between point 3 and 4 may be expressed:

$$V_2(t)=S_{24}\cdot\alpha_4\cdot u_4(x,t)\cdot S_{43}\cdot\alpha_3\cdot u_3(x,t)\cdot S_{31}\cdot V_1(t)\text{(double arrow 3=>4)} \quad 5$$

$$V_2(t)=S_{23}\cdot\alpha_3\cdot u_3(x,t)\cdot S_{34}\cdot\alpha_4\cdot u_4(x,t)\cdot S_{41}\cdot V_1(t)\text{(double arrow 4=>3)} \quad 6$$

Equation 6 is not used in solving the 7×7 problem and is replaced by a suitable approximation, see equations 16 and 17.

Figure 7C:
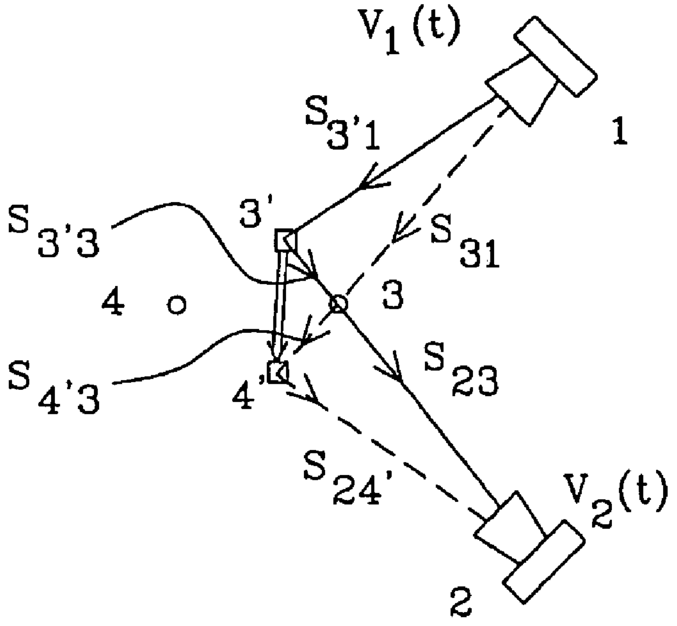

FIG. 7*c* illustrates the relationship of the double source corresponding to 3 and 4.

$$V_2(t)=S_{23}\cdot\alpha_3\cdot u_3(x,t)\cdot S_{3'3}\cdot\alpha_{3'}\cdot u_{3'}(x,t)\cdot S_{3'1}\cdot V_1(t)\text{(solid line)} \quad 7$$

$$V_2(t)=S_{24'}\cdot\alpha_{4'}\cdot u_{4'}(x,t)\cdot S_{4'3}\cdot\alpha_3\cdot u_3(x,t)\cdot S_{31}\cdot V_1(t)\text{(dashed line)} \quad 8$$

The relationship between point 3' and 4' may be expressed:

$$V_2(t)=S_{24'}\cdot\alpha_{4'}\cdot u_{4'}(x,t)\cdot S_{4'3'}\cdot\alpha_{3'}\cdot u_{3'}(x,t)\cdot S_{3'1}\cdot V_1(t)\text{(double arrow 3'=>4')} \quad 9$$

$$V_2(t)=S_{23'}\cdot\alpha_{3'}\cdot u_3(x,t)\cdot S_{3'4'}\cdot\alpha_4\cdot u_{4'}(x,t)\cdot S_{4'1}\cdot V_1(t)\text{(double arrow 4'=>3')} \quad 10$$

Equation 10 is not used in solving the 7×7 and 8×8 problem and is replaced by a suitable approximation, see equation 15 for the 8×8 problem and equations 16 and 17 for the 7×7 problem.

The following relationships are evident from FIGS. 7*a*-7*c:*

$$S_{41}=S_{43'}\cdot S_{3'1} \quad 11$$

$$S_{24}=S_{44'}\cdot S_{24'} \quad 12$$

$$S_{23'}=S_{33'}\cdot S_{23} \quad 13$$

$$S_{4'1}=S_{4'3}\cdot S_{31} \quad 14$$

Figure 7D:
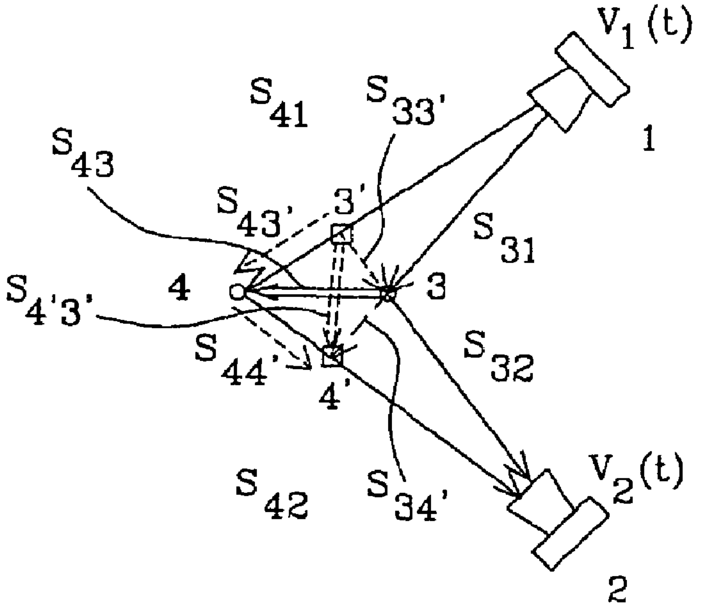

Equations 11-14 are used to eliminate S-parameters, which results in the S-parameters as illustrated in FIG. 7*d*. There is one S-parameter that is sought $S_{43}$ and one S-parameter that is completely uninteresting $S_{3'4'}$, together with several unknown S-parameters that require 10 equations to solve the problem, i.e. equations 1-10.

It is possible to reduce the number of equations needed to find the damping between point 3 and point 4 by applying a trick introduced by Zienkiewicz for Finite Elements.

Equation 10 is not used and an approximation is used instead:

$$15: \; S_{4'3'} \approx \frac{1}{2}[S_{4'3}S_{33'} + S_{4'4}S_{43'}]$$

It is even possible to reduce the number of equations needed to only 8 equations by applying Zienkiewicz trick twice, which eliminates the need of equations 6 and 10. The approximation used instead of the equations are:

$$16: \; S_{4'3'} \approx \frac{1}{2}[S_{4'3}S_{33'} + S_{44'}S_{43'}]$$

$$17: \; S_{43} \approx \frac{1}{2}[S_{43}S_{33'} + S_{44'}S_{34'}]$$

The damping $S_{43}$ between point 3 and 4 and between point 3' and 4' can be calculated by turning the needed equations to logarithms, Equations 1 through 10 become a inhomogeneous linear system of equations with as many unknowns as equations where a solution is always available as long as the analysis points are chosen properly. One has to solve the system for $S_{43}$ in order to obtain the microwave runtime between point 4 and point 3 illustrating the role of these points as "virtual probes".

The above described system uses a "virtual transmitter" (i.e. point 3) and a "virtual receiver" (i.e. point 4). One can easily place one of these point to coincide with a real transmit or receive antenna respectively arriving at the first usage of the invention. Placing both virtual probes at the place of the physical probe antennas will result in the traditional microwave measurement technique known prior to this invention.

Depending on the physical problem to be solved, one utilizes a single (virtual receiver or virtual transmitter) or both virtual probe concepts. It is also possible to use sets of probes (e.g. virtual probe arrays) to create a specific beam pattern generated/received by the virtual probes.

Different probe configurations may be used for applications as mine sweeping, material analysis, mineral exploration, medical applications etc.

Shorthand Mathematical Derivation of the Method:

Electromagnetic radiation is governed by Maxwell's equations where the vectorial electric field E is easily cast into a Helmholtz-form that is written in three dimensional space x and time t dependent coordinates as:

$$\Delta^2 E - \varepsilon_0 \varepsilon_r \mu_0 \mu_r \frac{\partial}{\partial t^2} E = 0$$

Where Δ is the Laplace operator, $\in_0$ the dielectric constant of vacuum, $\in_r$ the local relative dielectric function of the material at a given location (being a 3x3 tensor), $\mu_0$ stands for the permeability of vacuum and $\mu_r$ for the local relative permeability of the material under test. In this shorthand derivation, $\mu_r$ is set to be the unit tensor 1 (3x3). To a skilled person it is obvious that a similar method can be derived by solving for $\in_r$ and $\mu_r$ simultaneously.

At the same time, ultrasonic waves with a tensorial 3x3 stress amplitude y and a local sound speed of the medium v can also be cast in a similar form $$\Delta^2 y - v \frac{\partial}{\partial t^2} y = 0$$

The solutions of both differential equations are performed taking the location of the radiation sources into account. Focusing on the key point of the process, any ultrasonic wave with a non-vanishing amplitude creates a stress in the material (being of compression or shear type). This stress is reflected by a local compression of the material. By this compression, the density of polarized charge is affected—as a known fact, any compression of a dielectric object changes the relative dielectric function tensor $\in_r$ as:

$$\in_r \approx \in_{r0} + \alpha \cdot y$$

This relation creates a coupling between ultrasonic wave propagation and electromagnetic waves exploited in this invention. The strength of the interaction is determined by the acousto-optical interaction α being a 3x3x3 tensor. For a complete picture of the physics involved one has to mention that the above relation only holds for comparably small ultrasound waves where e.g. cavitation and other nonlinear effects can be neglected.

The complete system to be solved for electromagnetically is then given by:

$$\Delta^2 E(x, t) - \varepsilon_0[\varepsilon_{r0} + \alpha \cdot y(x, t)]\mu_0 \mu_r \frac{\partial}{\partial t^2} E(x, t) = 0$$

This type of differential equation becomes a convolution in frequency space ω when Fourier transform in time t is applied:

$$\Delta^2 E(x,\omega) + \omega^2 \in_0 [\in_{r0} + \alpha \cdot y(x,\omega)] \mu_0 \mu_r \otimes E(x,\omega) = 0$$

And where the circled times operator E(x,ω) denotes a frequency convolution integral (e.g. found in "Anleitung zum praktischen gebrauch der Laplace transformation" by G. Doetsch, 1988) that becomes in full form (omitting eventual normalization constants in front of the convolution integral):

$$[\Delta^2 + \omega^2 \varepsilon_0 \varepsilon_{r0} \mu_0 \mu_r] E(x, \omega) + \alpha \cdot \omega^2 \varepsilon_0 \mu_0 \mu_r \lim_{Q \to \infty} \int_{\xi=-Q}^{+Q} y(x, \omega - \xi) E(x, \xi) d\xi = 0$$

Therefore assuming a single frequency ultrasound excitation and a single frequency microwave signal incident to the object, the received microwave signals contain a part in the incident microwave frequency but also sidebands at the difference and sum of ultrasound and microwave frequencies created by the convolution integral.

The above relation offers a whole new world to extract information from a microwave field—by properly phase-controlling the ultrasound and by using pulsed wave trains.

Single Virtual Probe

One applies the method to solve along a path involving a single virtual probe. This corresponds to either a virtual transmitter or a virtual receiver depending on what transmission parameter one solves the upcoming linear equation system that has been described above where all relations to either point 3 or 4 vanish. The wave propagation mechanisms are identical for this case. For the ideal (homogenous, boundary condition free) case, one arrives at the following propagation relations:

$$[\Delta^2+\omega^2\in_0\in_r\mu_0\mu_r]E(x,\omega)+\alpha\cdot\omega^2\in_0\mu_0\mu_r E(X,\omega-\xi)=0$$

$$[\Delta^2+(\omega-\xi)^2\in_0\in_r\mu_0\mu_r]E(x,\omega-\xi)=+qE(X,\omega-\xi)$$

Double Virtual Probe

In addition one can apply the method to solve along a path through two virtual probes. This corresponds to either a virtual transmitter or a virtual receiver depending on what transmission parameter one solves the upcoming 9×9 linear equation system that has been described above where all equations are present. For the ideal (homogenous, boundary condition free) case, one arrives at the following propagation relations $$[\Delta^2+\omega^2\in_0\in_r\mu_0\mu_r]E(x,\omega)+\alpha\cdot\omega^2\in_0\mu_0\mu_r E(X,\omega-\xi)=0$$

$$[\Delta^2+(\omega-\xi)^2\in_0\in_r\mu_0\mu_r]E(x,\omega-\xi)=+qE(X,\omega-\xi)$$

$$[\Delta^2+(\omega-\xi-\eta)^2\in_0\in_r\mu_0\mu_r]E(x,\omega-\xi-\eta)=+q'qE(Y,\omega-\xi-\eta)$$

The first two equations denote the generation of a sideband at the analysis point X taking the role of a virtual transmitter. The third equation denotes the generation of a second sideband on top of the first by focussing at another analysis point Y which takes the role of a virtual receiver. The frequency offsets are denoted η at point X and η at point Y determined by the frequency of the ultrasound used to accomplish focusing. Please note that these may not be the same frequencies for both points X, Y in certain applications.

The first equation states the generation of a sideband at a predetermined location ξ with the sideband offset x. The second equation states the propagation of the sideband through the whole object under test when a source with strength q is placed a position X. The method allows therefore to "probe" the object by synthesizing a microwave source at arbitrary positions inside the object. One measures then the radiation generated from this source when moving this source around.

The invention has been described in connection with a microwave generator and an ultrasound generator, but it is obvious that other types of radiation may be used to create a density displacement within an object. However, the radiations must be emitted simultaneously and there must also be a difference in frequency between the emitted radiations to create the displacement. The resolution is determined by the radiation having the shortest wavelength in the object.

It is thus possible to simultaneously irradiate an object with two microwave signals having different frequencies, e.g. differing only 0.5 Hz, to create the density displacement and thereby determine the dielectric function of the material using the invention. Possible combinations of emitted radiation include, but are not limited to, any combination of microwave, ultrasound and x-ray.

It is also possible to perform the desired determination of the dielectric constant distribution and temperature of the product without the use of a density change wave formed by an ultrasound source or the like. The analysing step may in such instance be performed in accordance with the mathematical scheme disclosed in US2003024315, assigned to the present applicant.

US2003024315 discloses a measurement device comprising a microwave generator, a transmitting antenna, a receiving antenna, an analyser. These elements work together to analyse the distribution of material properties (such as water contents, density and temperature) in a material sample. The sample is carried on a conveyor means, which may consist of a slide table mounted on a linear motor, and is arranged in a measurement gap between said transmitting antenna and receiving antenna.

The generator is connected to the transmitting antenna and generates electromagnetic radiation, which is transmitted from the transmitting antenna towards the receiving antenna. The material sample is placed between said transmitting antenna and said receiving antenna, which indicate that at least a part of the transmitted radiation passed through the material sample. The electromagnetic radiation is transmitted in the form of signals, each having a first amplitude and phase, and a different frequency within a frequency range.

The generator is also connected to the analyser, and information regarding the amplitude and frequency of each transmitted signal is sent to the analyser.

The transmitted signals pass, at least partially, through the material sample and are received by the receiving antenna as receiving signals each having a second amplitude and phase, which may be different from the first amplitude and phase, for each different frequency.

The receiving antenna is connected to the analyser, which receives information regarding the received signals. The analyser compares the amplitude and phase of the transmitted signal with the corresponding amplitude and phase for the received signal, for each transmitted frequency.

Each transmitting antenna is designed to emit electromagnetic radiation of a set of selected frequencies partially impinging on and flowing through the material samples. Each receiving antenna is designed to receive electromagnetic radiation emitted from any transmit antenna and at least partially transmitted and reflected by the material sample. The receiving antenna may be set up at one or more positions enabling to scan the material sample.

The analyser acts as interface between the raw data and the user. The output of the analyser consists of a three-dimensional picture of the material sample's properties as density, water contents and/or temperature.

Information about the microwave attenuation and runtime (or phase and damping of the microwave power wave) between the transmitting antennas and receiving antennas are calculated in the analyser. For each frequency of the chosen frequency set and for a chosen set of transmitting-/receiving antenna pair and at a fixed point on the material sample such a calculation is performed.

In this embodiment of the invention it is assumed that the shape of the material sample is known, and a three dimensional image of the material sample is stored in a memory connected to the analyser. The three dimensional image may be used to calculate cross-sectional images for each measurement position of the material sample on the conveyor means.

Examples of a material where the three dimensional image is known are fluids passing through the gap in a tube or samples having a defined shape, such as candy bars.

For all measurement positions along the material sample, the results of the damping and phase measurement, for all frequencies, are used to determine an electromagnetic picture, which is obvious for a person skilled in the art and is therefore not disclosed in detail in this application. The position information from the memory is saved as a three dimensional surface position data set describing the three dimensional contour of the material sample.

The material properties (such as water contents, density and temperature) in a material may be obtained by interpolation of the material property distributions in the following.

Assume a set of material samples has been measured previously as references. The data sets are stored in their original size or in a transformed form to reduce the data size. For these materials, the distribution of the parameters to be measured is known. These can be different temperatures, different temperature profiles, different density and water contents distributions. Extracted parameters of the measurement of these reference products form a point in a high dimensional vector space. To each point in this space a specific distribution of the parameters to be determined is associated by interpolation of the adjacent points of the reference measurements. The measurement results on an unknown product is now associated with another point on this vector space. Since the parameter distribution to be measured is known for a certain region in the vector space, the distribution associated with the measured point yields the measurement result.

On the other hand direct calculation of the material property distribution may be applied.

Together with a three dimensional model of the dielectric structure of the material sample this three dimensional picture is used to determine regions within the measurement gap where the (yet unknown) dielectric function of the material can be assumed non-changing.

Each model comprises several regions, where the dielectric function is assumed to be constant. The number of regions in the models may be adjusted, even during the process of obtaining the material properties, to obtain a smooth, but not too smooth, curve for the dielectric constant as a function of x and y co-ordinates, ∈(x,y).

The regions are divided by concentric circles and a number of mapping points are arranged on the outer concentric circle. The distance between each mapping point is preferably essentially equal.

The appropriate model is adapted to the three dimensional image of the sample material, in this example a bread loaf, with a cross-section of a three-dimensional image of the bread loaf together with an x-axis and an y-axis. The contour of the bread is indicated by a line, which is derived from the three dimensional surface position data set stored in the memory, and the mapping points are mapped upon the contour line. The concentric circles are adjusted after the shape of the contour whereby the cross section of the bread loaf is divided into regions where the dielectric constant is assumed constant.

Below is described a simplified approach of CSI, anticipating regions where the dielectric function is constant.

Starting with the relation between the scattered field at a given location as a function of the contrast source one can simplify the solution process considerably when the location of regions where the dielectric function is constant are known a priori:

$$u_j(p) = u_j^{inc}(p) + k^2 \int_D G(p, q) \cdot \chi(q) \cdot u_j(q) \cdot dv(q)$$

$$\begin{aligned} u_j(p) &= u_j^{inc}(p) + k^2 \int_D G(p, q) \cdot \chi(q) \cdot u_j(q) \cdot dv(q) \\ &= u_j^{inc}(p) + k^2 \sum_{n=1}^{N} \chi_n \cdot \int_{D_N} G(p, q) \cdot u_j(q) \cdot dv(q) \end{aligned}$$

where G denotes again the two-dimensional Green's function of the electromagnetic problem $$G(p, q) = \frac{i}{4} H_0^{(j)}(k \cdot |p - q|)$$

and the polarisability $\chi_n$ depends on the dielectric function of the material ∈ being constant on the region Dm and the background $\in_b$ in the following way:

$$\chi_n = \frac{\varepsilon_n - \varepsilon_b}{\varepsilon_0}$$

Obviously the above step reduce the matrix size from the number of contrast sources to the number of different regions taken into account.

From the above a similar integral equation for the scattered electric field at any point r is set up.

$$F_j(r) = \frac{1}{4} k^2 \sum_{n=1}^{N} \chi_n \cdot \int_{D_n} H_0^{(i)}(k \cdot |r - q|) \cdot [F_j(q) + u_j^{inc}(q)] \cdot dv(q)$$

For this relation a similar solution process as in the general case is applied:

US2003024315 discloses in paragraph 0069-0085 how solve the above integral equation in order to determine the dielectric constant distribution.

This solution process involves the use of a three dimensional data set representing a three dimensional picture of the sample. The three dimensional picture makes it possible to reduce the number of unknowns in the calculation process when determining the dielectric function's distribution in the material sample. The obtained reduction in unknowns is significant and gives a significant reduction in calculation time (at least in today's available calculation power). The three dimensional picture may be obtained using video imaging, ultrasound imaging, or by other imaging systems. If the material samples have a simple geometric form or if subsequent material samples are very similar, no extra imaging is necessary to perform. The three dimensional picture may in such a case be stored in a memory.

Below is described a calculation of the dielectric function for one pair of antennas for various frequencies for frequency independent polarisation.

Starting with the relation between the scattered field at a given location as a function of the contrast source one can simplify the solution process considerably when the location of regions where the dielectric function is constant are known a priori:

$$u(p,f)=u^{inc}(p,f)+k^2\int_D G(p,q,f)\cdot\chi(q)\cdot u(q,f)\cdot dv(q)$$

In a step similar to the above procedure, the relation is simplified by introducing regions where the dielectric function is assumed to be constant:

$$u_j(p,f)=u^{inc}(p,f)+k^2\sum_{n=1}^{N}\chi_n\cdot\int_{D_N}G(p,q,f)\cdot u(q,f)\cdot dv(q)$$

where G denotes again the two-dimensional Green's function of the electromagnetic problem $$G(p,q,f)=\frac{i}{4}H_0^{(i)}(k\cdot|p-q|)$$

and the polarisability $\chi_n$ depends on the dielectric function of the material $\in$ being constant on the region $D_m$ and the background $\in_b$ in the following way:

$$\chi_n=\frac{\varepsilon_n-\varepsilon_b}{\varepsilon_0}$$

The wave vector k is defined to be the wave propagation constant in the background medium given by $\in_{r,b}$, $\mu_{r,b}$:

$$k=2\pi f\sqrt{\epsilon_o\mu_o\epsilon_{r,b}\mu_{r,b}}$$

From the above a similar frequency dependent integral equation for the scattered electric field at any point r is set up.

$$F(r,f)=\frac{i}{4}k^2\sum_{n=1}^{N}\chi_n\cdot\int_{D_N}H_0^{(i)}(k\cdot|r-q|)\cdot[F(q,f)+u^{inc}(q,f)]\cdot dv(q)$$

For this relation a similar solution process as in the general case is applied.

Below is described a calculation of the dielectric function for one pair of antennas for various frequencies for frequency dependent polarisation.

A first order approximation for the frequency dependence of the polarisation is obtained by grouping the measurement frequencies in two groups, a group at lower and a group at higher frequencies. The above summarised calculation process is repeated twice and the difference in the obtained polarisation values gives a measure for its frequency dependence.

In order to calculate the material parameters based on dielectric data, the relation between the material parameters as density, temperature and water content is needed. For most applications the following model for the temperature dependence of the dielectric function of water (extracted from experimental data published in IEEE Press 1995 by A. Kraszewski, with the title "Microwave Aquametry") is:

$$\varepsilon_{H2O}(T)=\frac{\varepsilon_\infty(T)}{1+\omega^2\tau(T)} \quad (1)$$

An approach (based on a simple volumetric mixing relation yields the dielectric chart depicted in FIG. 5 where the real and imaginary parts of the dielectric function are taken as independent co-ordinates:

$$\in(T,c_{H2O}d)=(1-c_{H2O})\cdot\in_{basis}\cdot d+C_{H2O}\cdot(\in_{H2O}(T)-\in_{basis}\cdot d) \quad (2)$$

Obviously every point in the complex dielectric plane stands for a unique water contents and material temperature when the dielectric properties of the dried base material do not change considerably. An unique density temperature plot is obtained, when the water contents is uniform.

From the spatial distribution of the dielectric function of the material sample, its density distribution moisture content and temperature are readily obtained applying a water model (see equation 1) and a mixing relation (see equation 2).

Figure 8:
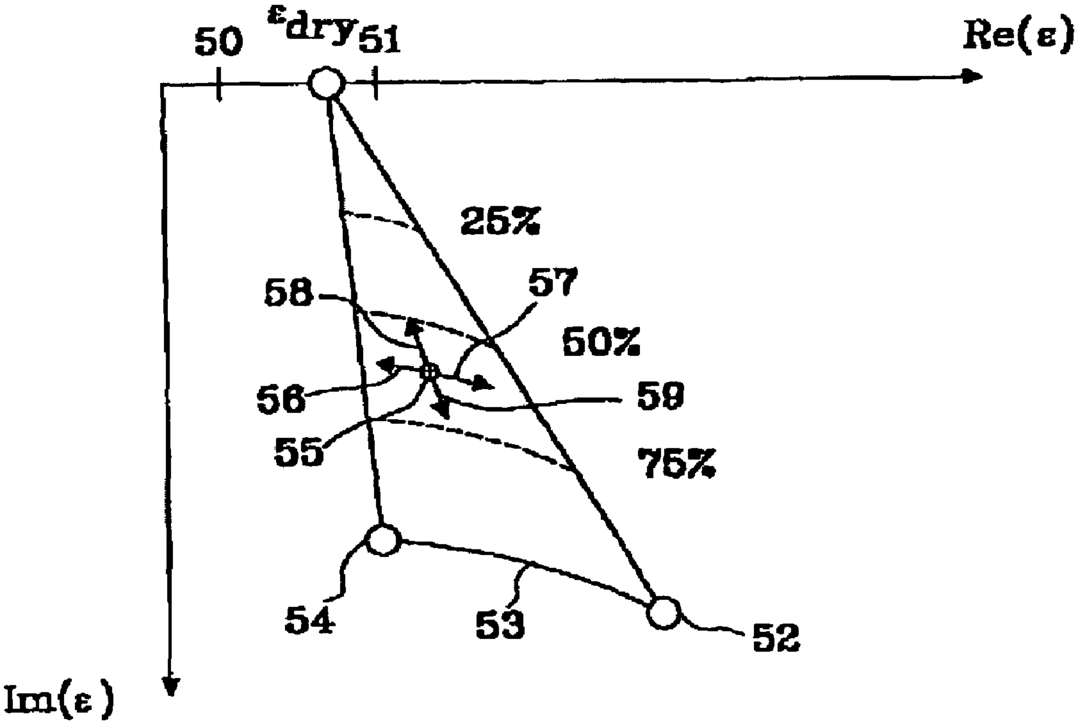
FIG. 8 shows a mathematical representation of the dielectric constant dependent upon the water content and temperature in a sample.

The imaginary part of the dielectric constant Im($\in$) forms a first axis in FIG. 8 and the real part of the dielectric constant Re($\in$) forms a second axis, perpendicular to the first axis. The real part is positive and the imaginary part is negative. Any material without water content have a specific dielectric constant, so called $\in_{dry}$, which vary between point 50 and 51 depending on the material, both only having a real part. On the other hand, pure water having a temperature of 4° C. has a dielectric constant 52 comprising both a real part and an imaginary part, and when the temperature of the water increase it follows a curve 53 to a point where pure water has a temperature of 99° C. and a dielectric constant 54. The real part of the dielectric constant for materials containing any amount of water decreases with higher temperature and the imaginary part of the dielectric constant for materials containing any amount of water increases with higher temperature. For illustration see the dashed lines in FIG. 5 for water content of 25, 50 and 75%.

An example of a dielectric value 55 is indicated in FIG. 8. The value 55 is situated within a region 56 delimited by the curve 53, stretching between point 52 and 54, a straight line between point 54 and $\in_{dry}$ and a straight line between $\in_{dry}$ and point 52. As mentioned before, if the temperature increase, with constant water content, the value of the dielectric constant 55 moves to the left in the graph as indicated by the arrow 56, and if the temperature decrease, with constant water content, the value 55 moves to the right as indicated by the arrow 57. On the other hand, if the water content decrease, with constant temperature, the value 55 moves towards $\in_{dry}$ as indicated by the arrow 58, and if the water content increase, 25 with constant temperature, the value 55 moves away from $\in_{dry}$ as indicated by the arrow 59.

For each defined region 43 the calculated, or estimated, dielectric constant may be directly transformed into water content and temperature.

The invention claimed is:

1. Method of determining a set of process parameters of a treatment unit in which unit a product is subjected to a temperature treatment, the method comprising:

providing a product, subjecting said product to a temperature treatment in a treatment unit, subjecting said product to a transmitted electromagnetic signal before, during and/or after said temperature treatment, wherein said transmitted electromagnetic signal is adapted to interact with said product, the product having a dielectric constant distribution and wherein said transmitted electromagnetic signal interacts with said product dependent upon the dielectric constant distribution of said product, subjecting said product to a second signal providing a local change, in time and position, of the dielectric constant distribution of said product, providing an interference between the second signal and the transmitted electromagnetic signal as the transmitted electromagnetic signal interacts with the product being subjected to said local, in time and position, change of the dielectric constant distribution, receiving an electromagnetic signal which has interacted with said product, analysing the received electromagnetic signal in comparison with the transmitted electromagnetic signal to determine a response dependent upon the dielectric constant distribution of said product and based on said response determine the temperature distribution of said product or the temperature in a predetermined location of said product or a water content of the product, and analysing said temperature distribution, temperature or water content of said product or a plurality of said products and based thereupon determining a set of process parameters for a temperature treatment in a treatment unit.

2. Method according to claim 1, further comprising providing said determined process parameters to a treatment unit.

3. Method according to claim 1, further comprising receiving data representing the temperature distribution or temperature of a plurality of products and based on said received data determining said set of process parameters for a temperature treatment in a treatment unit.

4. Method according to claim 3, further comprising receiving data representing the temperature distribution or temperature of a plurality of products treated in a plurality of treatment units and based on said received data determining said set of process parameters for a temperature treatment in a treatment unit.

5. Method according to claim 1, wherein the second signal is a signal providing a, in time and position, local change of the density of said product and locally, in time and position, influencing the dielectric constant distribution.

6. Method according to claim 1, wherein the second signal is an ultrasound signal.

7. Method according to claim 1, wherein the electromagnetic signal is a microwave signal.

8. System for determining a set of process parameters of a temperature treatment unit, the system comprising:

a first transmitter adapted to subject a product to a transmitted electromagnetic signal before, during and/or after a temperature treatment of said product, wherein the transmitted electromagnetic signal is adapted to interact with said product, the product having a dielectric constant distribution and wherein said transmitted electromagnetic signal interacts with said product dependent upon the dielectric constant distribution of said product, a second transmitter adapted to subject said product to a second signal providing a local change, in time and position, of the dielectric constant distribution of said product, the second transmitter being adapted to provide an interference between the second signal and the transmitted electromagnetic signal as the transmitted electromagnetic signal interacts with the product being subjected to said local, in time and position, change of the dielectric constant distribution, a receiver adapted to receive an electromagnetic signal which has interacted with said product, a signal analyser adapted to analyse the electromagnetic signal received by the receiver in comparison with the electromagnetic signal transmitted by the transmitter and, by analyzing the electromagnetic signal, determining a response being dependent upon the dielectric constant distribution of said product and, based on said response, determining the temperature distribution of said product or the temperature in a predetermined location of said product or the water content of said product before, during and/or after said temperature treatment, and a temperature analyser adapted to analyse said temperature distribution, temperature or the water content of said product or a plurality of said products and based thereupon determine a set of process parameters for a temperature treatment in a treatment unit.

9. System according to claim 8, further comprising a control unit adapted to provide said determined process parameters to a treatment unit.

10. System according to claim 8, wherein said temperature analyser is adapted to receive data representing said temperature distribution or temperature of a plurality of products and to based upon said received data determine said set of process parameters for a temperature treatment in a treatment unit.

11. System according to claim 10, wherein said temperature analyser is adapted to receive data representing said temperature distribution or temperature of a plurality of products treated in a plurality of treatment units and based thereupon determine said set of process parameters for a temperature treatment in a treatment unit.

12. System according to claim 8, wherein the second transmitter is adapted to subject said product to a second signal providing a, in time and position, local change of the density of said product and locally, in time and position, influencing the dielectric constant distribution.

13. System according to claim 8, wherein the second transmitter is an ultrasound transmitter.

14. System according to claim 8, wherein the first transmitter is a microwave transmitter.

* * * * *

UNITED STATES PATENT AND TRADEMARK OFFICE

CERTIFICATE OF CORRECTION

PATENT NO. : 7,520,667 B2
APPLICATION NO. : 11/432296
DATED : April 21, 2009
INVENTOR(S) : S. Påhlsson et al.

It is certified that error appears in the above-identified patent and that said Letters Patent is hereby corrected as shown below:

| COLUMN | LINE | |
|---|---|---|
| 25 (Claim 5) | 43 | "a, in time and position, local change" should read --a local change, in time and position,-- |
| 26 (Claim 10) | 38 | "and to based upon said received data determine" should read --and, based upon said received data, to determine-- |
| 26 (Claim 12) | 48 | "a, in time and position, local change" should read --a local change, in time and position,-- |

Signed and Sealed this

Twenty-ninth Day of September, 2009

David J. Kappos
*Director of the United States Patent and Trademark Office*